(12) United States Patent
Wu

(10) Patent No.: US 11,500,917 B2
(45) Date of Patent: Nov. 15, 2022

(54) PROVIDING A SUMMARY OF A MULTIMEDIA DOCUMENT IN A SESSION

(71) Applicant: Microsoft Technology Licensing, LLC, Redmond, WA (US)

(72) Inventor: Xianchao Wu, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 55 days.

(21) Appl. No.: 16/754,739

(22) PCT Filed: Nov. 24, 2017

(86) PCT No.: PCT/CN2017/112961
§ 371 (c)(1),
(2) Date: Apr. 8, 2020

(87) PCT Pub. No.: WO2019/100350
PCT Pub. Date: May 31, 2019

(65) Prior Publication Data
US 2020/0320116 A1    Oct. 8, 2020

(51) Int. Cl.
*G06F 16/483* (2019.01)
*G06F 16/45* (2019.01)
(Continued)

(52) U.S. Cl.
CPC .......... *G06F 16/483* (2019.01); *G06F 16/438* (2019.01); *G06F 16/45* (2019.01);
(Continued)

(58) Field of Classification Search
CPC ....... G06F 16/483; G06F 16/45; G06F 16/438
(Continued)

(56) References Cited

U.S. PATENT DOCUMENTS 7,724,959 B2  5/2010  Chiu et al.
8,200,063 B2  6/2012  Chen et al.
(Continued)

FOREIGN PATENT DOCUMENTS

CN  106775665 A  5/2017
CN  106855879 A  6/2017
CN  106980640 A  7/2017

OTHER PUBLICATIONS

Chernykh, et al., "Emotion Recognition From Speech With Recurrent Neural Networks", in Repository of arXiv:1701.08071, Jan. 27, 2017, 13 Pages.
(Continued)

*Primary Examiner* — Kimberly L Wilson
(74) *Attorney, Agent, or Firm* — Schwegman Lundberg & Woessner, P.A.

(57) ABSTRACT

The present disclosure provides method and apparatus for providing a summary of a multimedia document in a session. In some implementations, a message may be received from a user in a session and the session is between the user and an electronic conversational agent. The multimedia document may be obtained based at least on the message. The emotion information in the multimedia document may be extracted. The summary of the multimedia document may be generated based at least on the message and the extracted emotion information. A response including the generated summary of the multimedia document may be provided to the user.

20 Claims, 19 Drawing Sheets

(51) Int. Cl.
  *G06F 16/438*  (2019.01)
  *G06F 16/9032* (2019.01)
  *G06N 5/02*   (2006.01)
  *H04L 51/10*  (2022.01)

(52) U.S. Cl.
  CPC ......... *G06F 16/90332* (2019.01); *G06N 5/02* (2013.01); *H04L 51/10* (2013.01)

(58) Field of Classification Search
  USPC ........................................................ 707/731
  See application file for complete search history.

(56) References Cited

U.S. PATENT DOCUMENTS

| | | | |
|---|---|---|---|
| 8,587,677 | B2 | 11/2013 | Shingu |
| 8,818,803 | B2 | 8/2014 | Weber |
| 9,634,855 | B2* | 4/2017 | Poltorak ............ G06K 9/00302 |
| 9,652,851 | B2 | 5/2017 | Artan et al. |
| 2010/0235451 | A1 | 9/2010 | Yu et al. |
| 2014/0086554 | A1 | 3/2014 | Yehezkel et al. |
| 2016/0342895 | A1 | 11/2016 | Gao et al. |
| 2017/0132498 | A1 | 5/2017 | Cohen et al. |
| 2017/0250930 | A1 | 8/2017 | Ben-itzhak |

OTHER PUBLICATIONS

Cho, et al., "Learning Phrase Representations using RNN Encoder-Decoder for Statistical Machine Translation", in Proceedings of the Conference on Empirical Methods in Natural Language Processing, Oct. 25, 2014, pp. 1724-1734.

Davletcharova, et al., "Detection and Analysis of Emotion From Speech Signals", in Repository of arXiv:1506.06832, Jun. 23, 2015, 6 Pages.

Gong, et al., "A Semantic Similarity Language Model to Improve Automatic Image Annotation", in Proceedings of the 22nd IEEE International Conference on Tools with Artificial Intelligence, vol. 1, Oct. 27, 2010, pp. 197-203.

Hajimirza, S. Navid, "Implicit Image Annotation by Using Gaze Analysis", in PhD Thesis Submitted to Queen Mary University of London, 2012, 177 Pages.

Krizhevsky, et al., "ImageNet Classification with Deep Convolutional Neural Networks", in Proceedings of 26th Annual Conference on Neural Information Processing Systems, Dec. 3, 2012, pp. 1-9.

Li, Wenchen, et al., "Text Summarization: Applications", Retrieved from: https://medium.com/@wenchen.li/text-summarization-applications-ed319f0bb13c, May 25, 2017, 8 Pages.

Luthra, et al., "A Machine Learning based Approach to Video Summarization", in Proceedings of the First Biennial National Conference on Computer Vision, Pattern Recognition, Image Processing and Graphics, Jan. 11, 2008, 5 Pages.

Mikolov, et al., "Distributed Representations of Words and Phrases and their Compositionality", in Proceedings of Advances in Neural Information Processing Systems, Dec. 5, 2013, 9 Pages.

Mikolov, et al., "Recurrent Neural Network Based Language Model", in Proceedings of the 11th Annual Conference of the International Speech Communication Association, Sep. 26, 2010, pp. 1045-1048.

"International Search Report and Written Opinion Issued in PCT Application No. PCT/CN17/112961", dated Aug. 17, 2018, 9 Pages.

Russell, et al., "LabelMe: A Database and Web-Based Tool for Image Annotation", in International Journal of Computer Vision, vol. 77, Issue 1-3, May 2008, pp. 0-32.

"European Search Report issued in European Patent Application No. 17933027.9", dated May 4, 2021, 8 Pages.

"First Office Action and Search Report Issued in Chinese Patent Application No. 201780087285.9", dated Dec. 7, 2021, 10 Pages.

"Office Action Issued in Chinese Patent Application No. 201780087285.9", dated Aug. 10, 2022, 9 Pages.

\* cited by examiner

PROVIDING A SUMMARY OF A MULTIMEDIA DOCUMENT IN A SESSION

CROSS-REFERENCE TO RELATED APPLICATION

This application is a U.S. National Stage Filing under 35 U.S.C. 371 of International Patent Application Serial No. PCT/CN2017/112961, filed Nov. 24, 2017, and published as WO 2019/100350 A1 on May 31, 2019, which application and publication are incorporated herein by reference in their entirety.

BACKGROUND

Artificial Intelligence (AI) chatbot is becoming more and more popular, and is being applied in an increasing number of scenarios. The chatbot is designed to simulate people's conversation, and may chat with users by text, voice, image, etc. Generally, the chatbot may scan for keywords within a message input by a user or apply natural language processing on the message, and provide a response with the most matching keywords or the most similar wording pattern to the user.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for providing a summary of a multimedia document in a session. In some implementations, a message may be received from a user in a session and the session is between the user and an electronic conversational agent. The multimedia document may be obtained based at least on the message. Emotion information in the multimedia document may be extracted. The summary of the multimedia document may be generated based at least on the message and the extracted emotion information. A response including the generated summary of the multimedia document may be provided to the user.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

When people are browsing text documents, such as, articles, news, historical conversation records of an individual or group chat with a chatbot or other people, etc., they may want to check important or interested information in the text documents. It may take lots of time for the people to find such important or interested information from the text documents, and this procedure may be very boring and less productivity.

Embodiments of the present invention propose to utilize a chatbot to provide a summary of a text document to a user in a brief way through a summary generation method. The chatbot may filter out important or interested information from the text document, through reviewing the text document and generating a summary of the text document automatically. In addition to text documents, the summary generation method proposed by the embodiments of the present invention may also be applied to other forms of documents, such as, image documents, voice documents, video documents and so on. The text documents, image documents, voice documents, video documents, etc. may also be collectively called as multimedia documents.

The embodiments of the present disclosure may review a multimedia document and provide a summary thereof to a user in a session. The session may refer to a time-continuous dialog between two chatting participants, which directs for answering questions from a user by a chatbot, and may include messages and responses in the dialog. Herein "message" refers to any information inputted by the user, e.g., queries/questions from the user, answers of the user to questions from the chatbot, documents indicated by the user, opinions of the user, etc., and "response" refers to any information provided by the chatbot, e.g., summary of a multimedia document, answers of the chatbot to questions from the user, comments of the chatbot, etc. The term "message" and the term "query" may also be interchangeably used.

In some aspects, the chatbot may provide a summary of a multimedia document based on emotion analysis. On one hand, the summary may be determined based on the emotion analysis. On the other hand, the chatbot may provide emotion analysis distribution information of the summary to the user.

Through the embodiments of the present disclosure, a user may learn about important or interested information of a multimedia document in a short time without the need of reading, listening or viewing the complete multimedia document.

Figure 1:
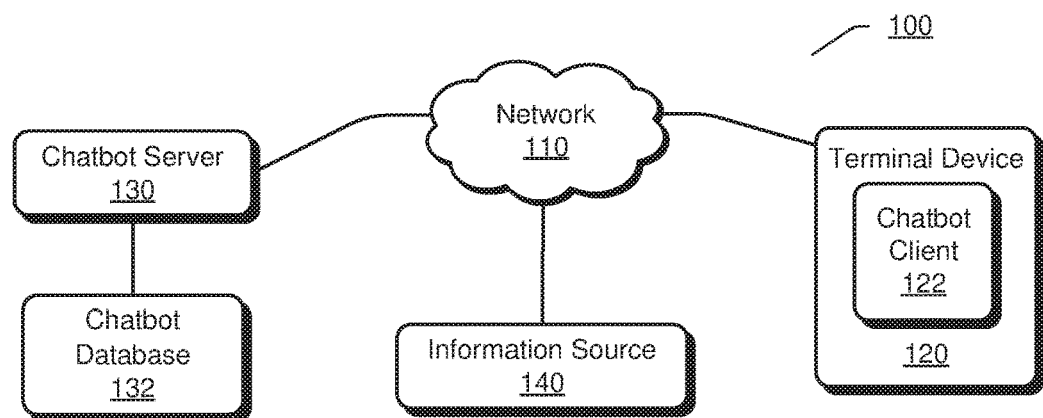
FIG. 1 illustrates an exemplary application scenario of a chatbot according to an embodiment.

FIG. 1 illustrates an exemplary application scenario 100 of a chatbot according to an embodiment.

In FIG. 1, a network 110 is applied for interconnecting among a terminal device 120, a chatbot server 130 and an information source 140.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be a desktop computer, a laptop, a tablet, a smart phone, an AI terminal, etc. Although only one terminal device 120 is shown in FIG. 1, it should be appreciated that a different number of terminal devices may connect to the network 110.

In an implementation, the terminal device 120 may be used by a user. The terminal device 120 may include a chatbot client 122 which may provide automated chatting service for the user. In some implementations, the chatbot client 122 may interact with the chatbot server 130. For example, the chatbot client 122 may transmit messages inputted by the user to the chatbot server 130, and receive responses associated with the messages from the chatbot server 130. However, it should be appreciated that, in other implementations, instead of interacting with the chatbot server 130, the chatbot client 122 may also locally generate responses to messages inputted by the user.

The chatbot server 130 may connect to or incorporate a chatbot database 132. The chatbot database 132 may comprise information that can be used by the chatbot server 130 for generating responses.

The information source 140 may refer to websites, email-boxes, news channels, movie channels, radio broadcasting, social network applications, e-commence applications, video monitoring systems and so on that can provide various multimedia documents or information. Context information about the multimedia documents may also be stored in the information source 140, which may be used for supplementing background or context of the multimedia documents in generating summaries of the multimedia documents.

In some implementations, the chatbot server 130 may collect a multimedia document from the information source 140 and determine a summary of the multimedia document for the user of the terminal device 120. The chatbot client 122 may interact with the chatbot server 130 and present the determined summary to the user.

It should be appreciated that all the network entities shown in FIG. 1 are exemplary, and depending on specific application requirements, any other network entities may be involved in the application scenario 100.

Figure 2:
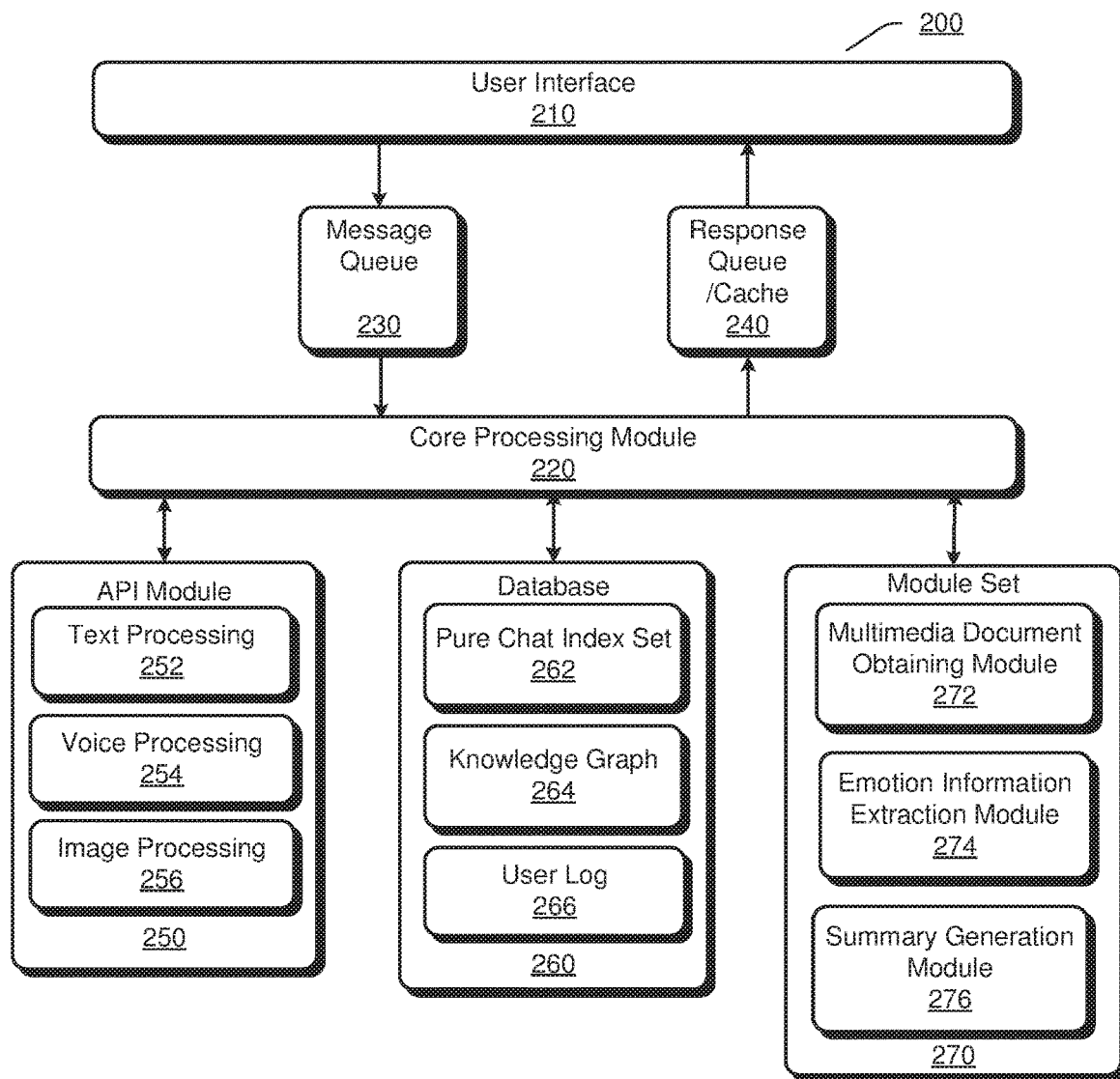
FIG. 2 illustrates an exemplary chatbot system according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user. The UI 210 may be specific to the chatbot, or be incorporated in a third-party application, such as, Facebook, Wechat, LINE, LinkedIn, Slack or any other social network applications.

The chatbot system 200 may comprise a core processing module 220. The core processing module 220 is configured for, during operation of the chatbot, providing processing capabilities through cooperation with other modules of the chatbot system 200.

The core processing module 220 may obtain messages inputted by the user in the chat window, and store the messages in the message queue 230. The messages may be in various multimedia forms, such as, text, voice, image, video, etc.

The core processing module 220 may process the messages in the message queue 230 in a first-in-first-out manner. The core processing module 220 may invoke processing units in an application program interface (API) module 250 for processing various forms of messages. The API module 250 may comprise a text processing unit 252, a voice processing unit 254, an image processing unit 256, etc.

For a text message, the text processing unit 252 may perform text understanding on the text message, and the core processing module 220 may further determine a text response.

For a voice message, the voice processing unit 254 may perform a voice-to-text conversion on the voice message to obtain text sentences, the text processing unit 252 may perform text understanding on the obtained text sentences, and the core processing module 220 may further determine a text response. If it is determined to provide a response in voice, the voice processing unit 254 may perform a text-to-voice conversion on the text response to generate a corresponding voice response.

For an image message, the image processing unit 256 may perform image recognition on the image message to generate corresponding texts, and the core processing module 220 may further determine a text response. In some cases, the image processing unit 246 may also be used for obtaining an image response based on the text response.

Moreover, although not shown in FIG. 2, the API module 250 may also comprise any other processing units. For example, the API module 250 may comprise a video processing unit for cooperating with the core processing module 220 to process a video message and determine a response.

The core processing module 220 may determine responses through a database 260. The database 260 may comprise a plurality of index items that can be retrieved by the core processing module 220 for determining responses.

The database 260 may comprise a pure chat index set 262. The pure chat index set 262 may comprise index items that are prepared for free chatting between the chatbot and users, and may be established with data from, e.g., social networks. The index items in the pure chat index set 262 may or may not be in a form of question-answer (QA) pair, e.g., <question, answer>. Question-answer pair may also be referred to as message-response pair.

The database 260 may comprise a knowledge graph 264. Herein, the knowledge graph 264 may refer to a single knowledge graph or a plurality of knowledge graphs in various domains. For example, the knowledge graph 264 may comprise concept-based knowledge graph (CKG). Herein, "concept" in the CKG may refer to attributes or descriptions of an entity that is directed by the CKG. The knowledge graph 264 may be established from websites on the network, such as, Wikipedia, Baidu Baike, Hudong Baike, and so on. Knowledge information in the knowledge graph 264 may be in a form of tuple or in "key-value" style.

The database 260 may comprise a user log 266. The user log 266 may comprise all information related to the user, for example, dialog record during sessions between the chatbot and the user, personalized information of a user, emails in the user's email box, photos and videos taken or stored by the user, music listened or downloaded by the user, and so on.

The chatbot system 200 may comprise a module set 270 which is a collection of functional modules that may be operated by the core processing module 220 to generate or obtain summaries of multimedia documents.

The module set 270 may comprise a multimedia document obtaining module 272 that may be configured for obtaining multimedia documents. In some cases, the user may upload or mention a multimedia document in a session with the chatbot, and thus the multimedia document obtaining module 272 may obtain the multimedia document from the session, from the user log 266, from the network or from a pre-established database, wherein the multimedia document may be in various forms, such as, text, voice, image, video, etc. Further, the multimedia document obtaining module 272 may also obtain context information about the multimedia document from the user log 266 or from the knowledge graph 264.

The module set 270 may comprise an emotion information extraction module 274. The emotion information extraction module 274 may be configured for extracting emotion information in a multimedia document through emotion analysis. The emotion information extraction module 274 may be implemented based on, such as, a recurrent neural network (RNN) together with a SoftMax layer. The emotion information may be represented, e.g., in a form of vector, and may be further used for deriving an emotion category.

The module set 270 may comprise a summary generation module 276. The summary generation module 276 may be configured for generating a summary of a multimedia document based on emotion information of the multimedia document. The summary may be included in a response to be provided to the user.

The core processing module 220 may provide the generated responses to a response queue or response cache 240. For example, the response cache 240 may ensure that a sequence of responses can be displayed in a pre-defined time stream. Assuming that, for a message, there are no less than two responses generated by the core processing module 220, then a time-delay setting for the responses may be necessary. For example, if a message inputted by the user is "Did you eat your breakfast?", two responses may be generated, such as, a first response "Yes, I ate bread" and a second response "How about you? Still feeling hungry?". In this case, through the response cache 240, the chatbot may ensure that the first response is provided to the user immediately. Further, the chatbot may ensure that the second response is provided in a time delay, such as 1 or 2 seconds, so that the second response will be provided to the user 1 or 2 seconds after the first response. As such, the response cache 240 may manage the to-be-sent responses and appropriate timing for each response.

The responses in the response queue or response cache 240 may be further transferred to the UI 210 such that the responses can be displayed to the user in the chat window.

It should be appreciated that all the elements shown in the chatbot system 200 in FIG. 2 are exemplary, and depending on specific application requirements, any shown elements may be omitted and any other elements may be involved in the chatbot system 200.

Figure 3:
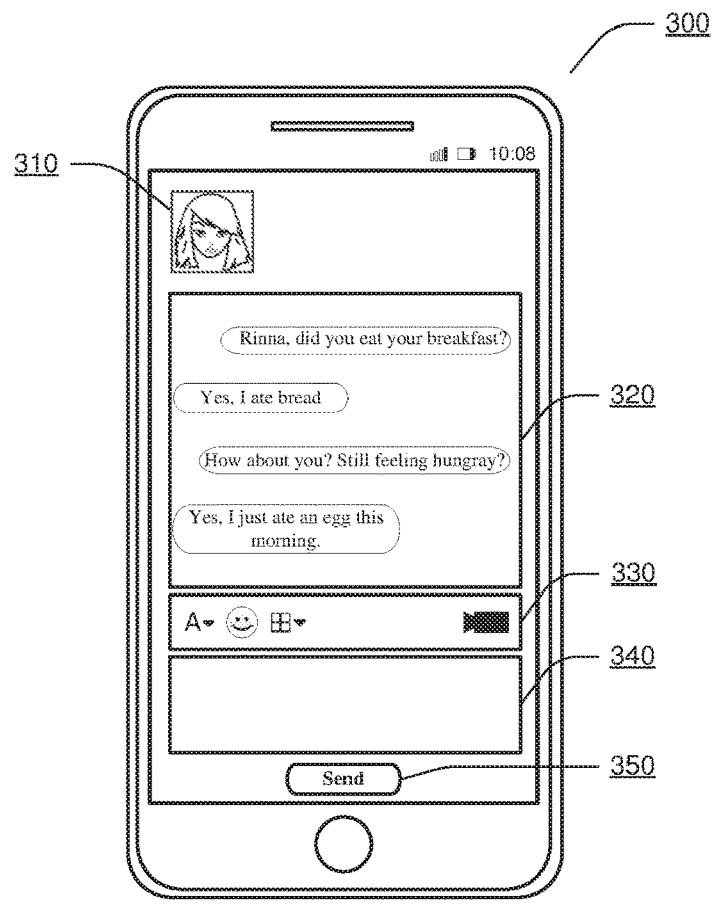
FIG. 3 illustrates an exemplary user interface according to an embodiment.

FIG. 3 illustrates an exemplary user interface 300 according to an embodiment.

The user interface 300 may be included in a terminal device, and may comprise a chatbot icon 310, a presentation area 320, a control area 330 and an input area 340. The chatbot icon 310 may be a photo or picture representing the chatbot, such as logo, name and homepage URL of the chatbot. The presentation area 320 may display a chat window that may contain messages and responses in a session between a user and the chatbot. The control area 330 may include a plurality of virtual buttons for the user to perform message input settings. For example, the user may select to make a voice input, attach image files, select emoji symbols, make a short-cut of the current screen, activate camera, make a voice call or video conversation with the chatbot, etc. through the control area 330. The input area 340 may be used by the user for inputting messages. For example, the user may type text through the input area 340. The user interface 300 may further comprise a virtual button 350 for confirming to send the inputted messages. If the user touches the virtual button 350, the messages inputted in the input area 340 may be sent to the presentation area 320.

It should be appreciated that all the elements and their layout shown in FIG. 3 are exemplary. Depending on specific application requirements, the user interface in FIG. 3 may omit or add any elements, and the layout of the elements in the user interface in FIG. 3 may also be changed in various approaches. For example, although the messages and responses are shown in a form of text in the presentation area 320, the messages and responses may also be in a form of voice. Accordingly, the chatbot and the user may chat by voices.

Figure 4A:
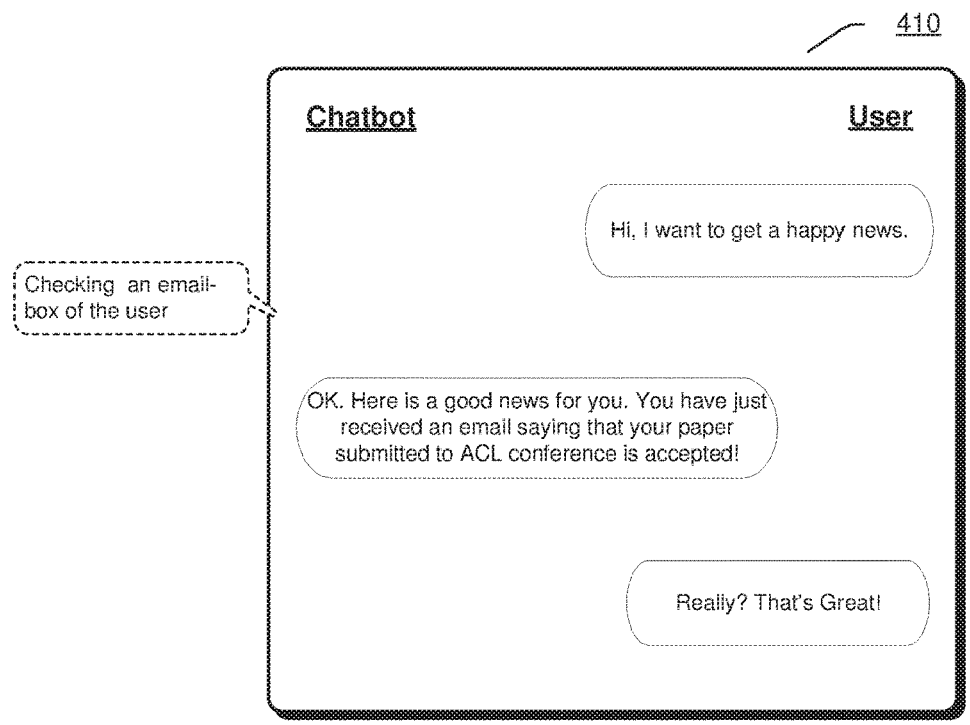
FIG. 4A-FIG. 4D illustrate exemplary chat windows according to embodiments.

FIG. 4A illustrates an exemplary chat window 410 for providing a summary of a text document according to an embodiment.

When the chatbot receives a message about "I want to get a happy news" from the user, the chatbot may check the user log to obtain a multimedia document comprising various news or information of the user. For example, the chatbot may check an email-box of the user, and select an email in which contents are with emotion category of, such as, "joy", "ecstasy" and so on, based at least on emotion categories of emails in the email-box and an emotion category of "happy" contained in the message from the user. The chatbot may form a summary of the selected email based on the contents in the selected email and provide a response including the summary to the user, such as "OK. Here is a good news for you. You have just received an email saying that your paper submitted to ACL conference is accepted!" In some implementations, the selected email may just mention "Accepted" or "Your paper is accepted". In such case, the summary may be generated further based on context information obtained from other relevant emails in the email-box. For example, the context information may comprise information about the user's paper submitted to ACL conference mentioned in one or more previous emails in the user's email-box.

Figure 4B:
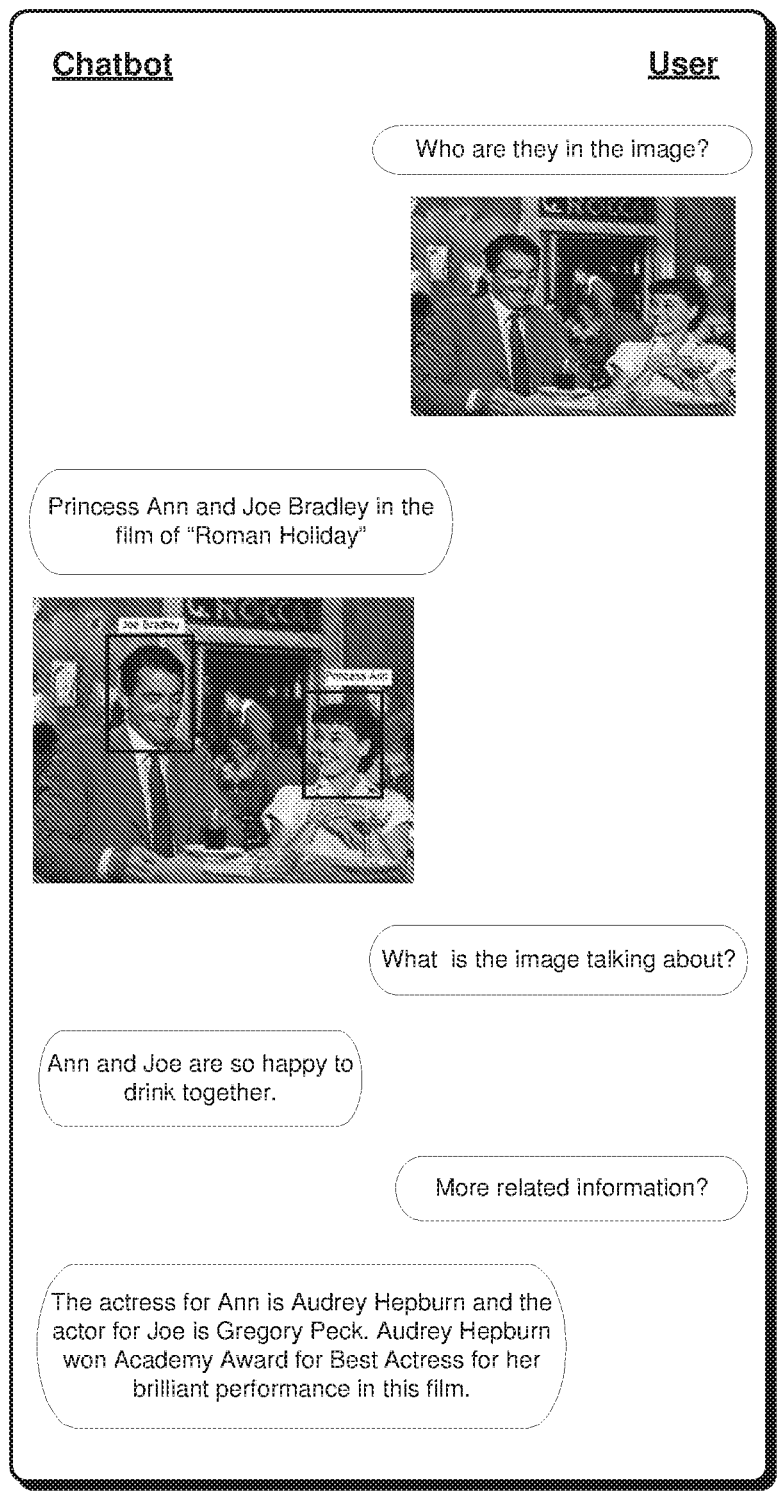

FIG. 4B illustrates an exemplary chat window 420 for providing a summary of an image document according to an embodiment.

The user provides an image in the chat window 420 and asks "who are they in the image?". The chatbot may identify regions of interest (RoIs) in the image, e.g., faces of the people, and match the RoIs with information from a knowledge graph which is established from, such as, websites and/or the user log. Through matching, the chatbot may find that the faces of the two people in the image are associated with the film named "Roman Holiday" and the two people in the image are Princess Ann and Joe Bradley respectively. Thus, the chatbot may provide a response as "Princess Ann and Joe Bradly in the film of 'Roman Holiday'" to the user. Meanwhile, an updated image with annotations of Princess Ann and Joe Bradley, including highlighting blocks and names, may be provided to the user.

The user further asks "What is the image talking about?". The chatbot may determine that the user wants to know important information of the image and/or the film. The chatbot may identify fact information and/or emotion information for the RoIs of the image, wherein the fact information may reflect facts or events in the image, e.g., two people are drinking, and the emotion information may reflect emotion categories of the RoIs, e.g., emotion "joy" on people's faces, etc. The chatbot may generate a summary of the image based at least on the determined emotion information for each identified RoI, the received message indicating what the user wants to know, and/or context information about "Ann" and "Joe" in the film "Roman Holiday" obtained from the knowledge graph, and provide a response including the generated summary, such as, "Ann and Joe are so happy to drink together" to the user.

Then, the user may want to know more related information. The chatbot may obtain some further context information from a CKG or a user log and provide it to the user, as shown in FIG. 4B.

Figure 4C:
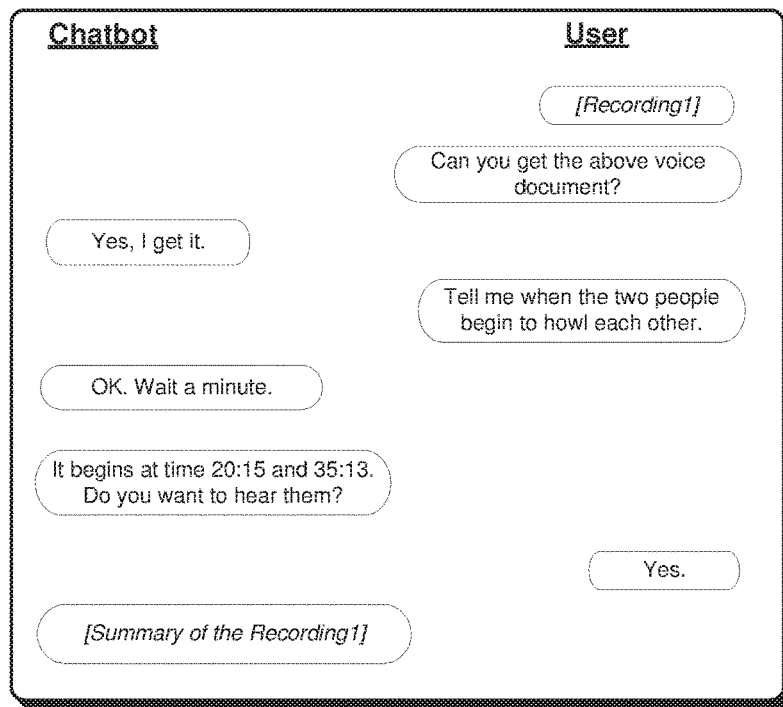

FIG. 4C illustrates an exemplary chat window 430 for providing a summary of a voice document according to an embodiment.

Conventionally, if the duration of a voice document is long, it will take lots of time for people to listen to the whole voice document in order to obtain a specific voice segment, e.g., a voice segment about howling. In contrast, the chatbot according to the embodiments of the present disclosure may help a user to find such voice segment which is construed as a summary of the voice document.

In the chat window 430, the user may provide a voice document to the chatbot, as [Recording1]. When receiving the voice document and a message "Can you get the above voice document?" from the user, the chatbot may give a response "Yes, I get it" based on a pure chat index set.

If an exemplary message "Tell me when the two people begin to howl each other" is inputted by the user, the chatbot may identify voice segments from the voice document and determine emotion information of each voice segment. The chatbot may compare the emotion information of each voice segment with emotion information associated with "howling", and keep matched voice segments, e.g., segment at time 20.15 and segment at time 35.13, along with corresponding emotion information. Then, the chatbot may combine the matched voice segments to generate a summary of the howling parts in the voice document, and provide a response including the generated summary to the user, e.g., [Summary of the Recording1] in the chat window 420. In an implementation, fact information of each voice segment may also be considered when generating the summary.

It should be appreciated that the voice document may be in any audio format, e.g., mp3, way, wma, etc.

Figure 4D:
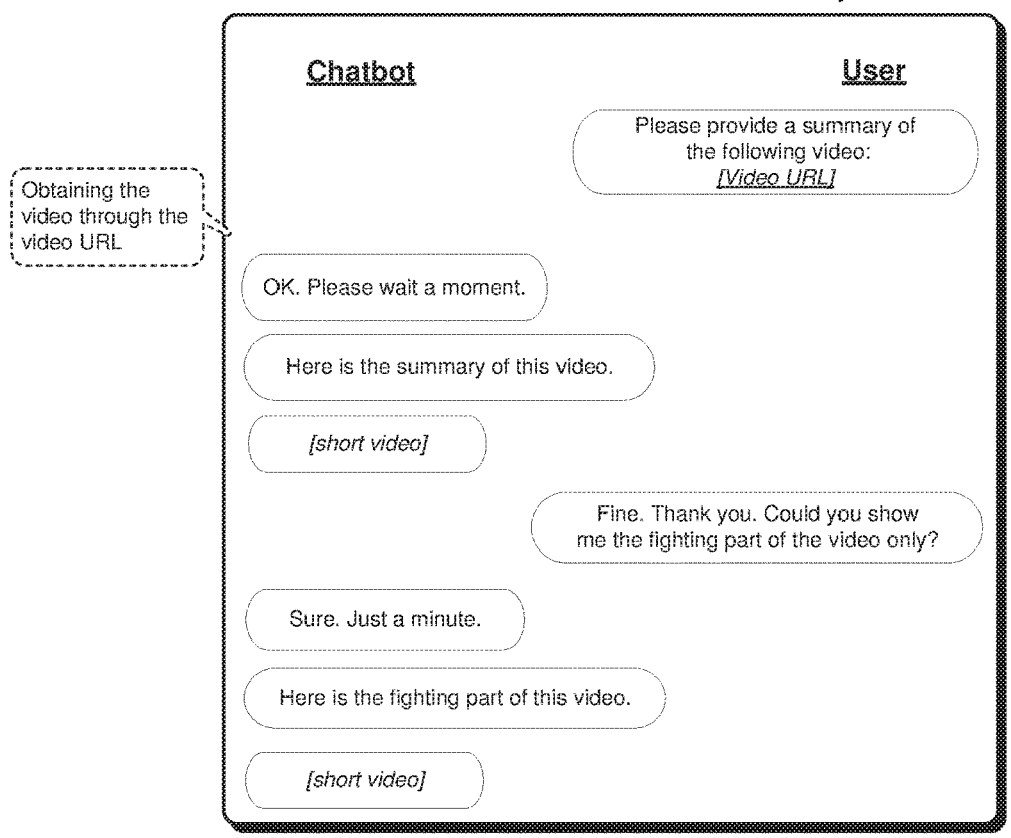

FIG. 4D illustrates an exemplary chat window 440 for providing a summary of a video document according to an embodiment.

As shown in the chat window 440, when receiving a message "Please provide a summary of the following video: [Video URL]" from the user, the chatbot may obtain the complete video through the video URL, identify each video clip which comprises both image and voice, determine emotion information of each video clip by determining emotion information of image part and/or voice part in the video clip, and generate a summary of the video based at least on an emotion category of the whole video and associated video clips. For example, if the emotion category of the whole video is sadness, the chatbot may generate a summary of the video by keeping and combining video clips with emotion category "sadness", and provide a response including the generated summary to the user.

When the user asks the chatbot to show the fighting part of the video only, the chatbot may compare emotion information of each video clip with emotion information associated with "fighting", keep matched video clips, generate a summary about fighting part based on the matched video clips, and provide a response including the generated summary to the user.

It should be appreciated that the chat flows in the chat windows 410, 420, 430 and 440 are exemplary, and the embodiments of the present invention are not limited to any detailed expressions or procedures in the chat windows 410, 420, 430 and 440.

Figure 5:
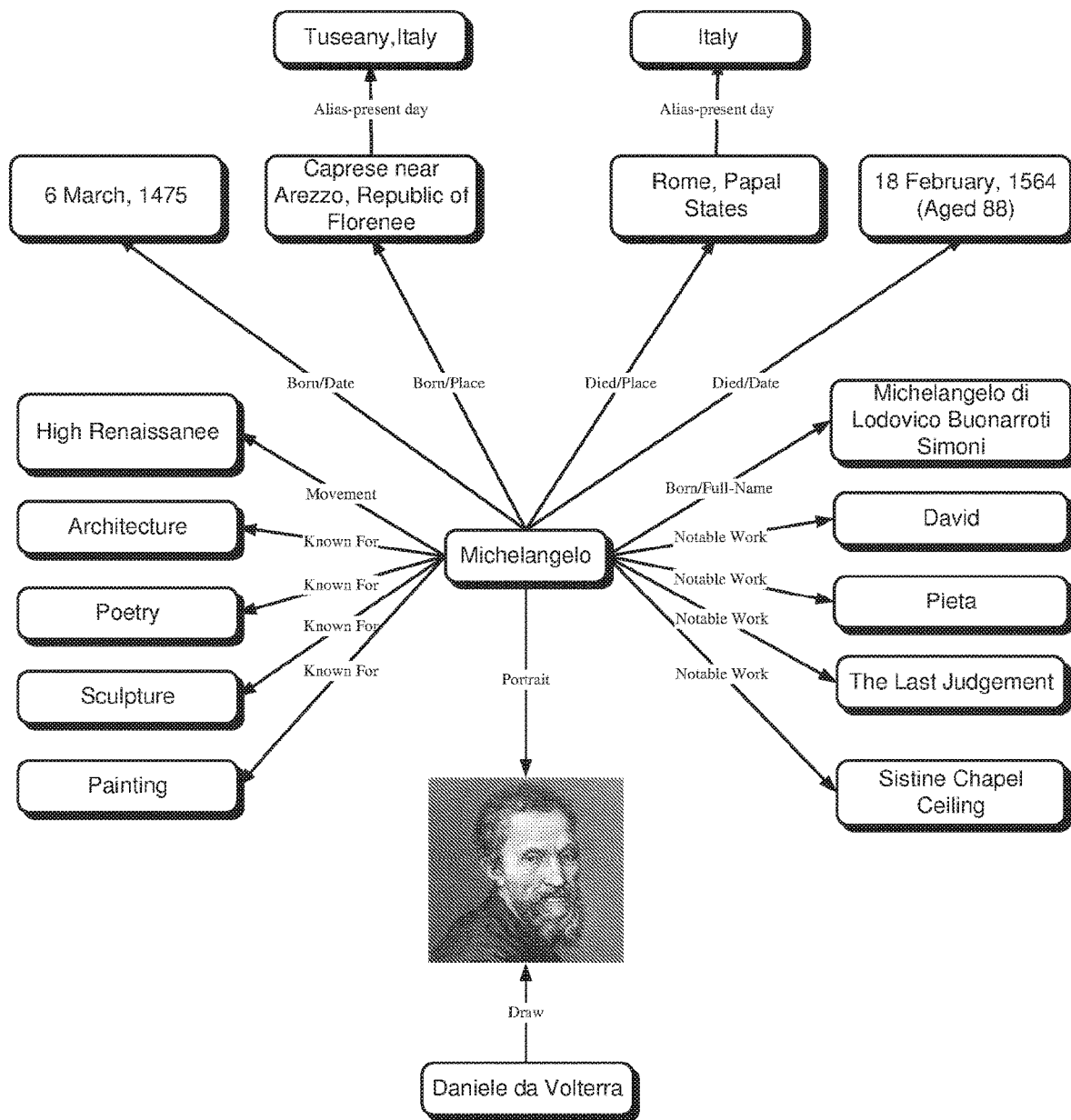
FIG. 5 illustrates an exemplary concept-based knowledge graph (CKG) according to an embodiment.

FIG. 5 illustrates an exemplary concept-based knowledge graph (CKG) 500 according to an embodiment.

Data in a CKG may be in forms of text, image, voice and video. In some implementations, image, voice and video documents may be transformed into textual form and stored in the CKG to be used for CKG mining. For example, as for image documents, images may be transformed into texts by using image-to-text transforming model, such as a recurrent neural network-convolutional neural network (RNN-CNN)

model. As for voice documents, voices may be transformed into texts by using voice recognition models. As for video documents which comprise voice parts and image parts, the voice parts may be transformed into texts by using the voice recognition models, and the image parts may be transformed into texts by using 2D/3D convolutional networks to project video information into dense space vectors and further using the image-to-text models. Videos may be processed through attention-based encoding-decoding models to capture text descriptions for the videos.

When constructing a CKG, time related information and location related information may be taken as concepts and/or as attributes of noun-style concepts. The CKG may be constructed in a form of <node, edge, node> or <concept, relationship, concept>. A topic or an entity directed by the CKG may relate to a list of concepts and may be defined by a lifecycle with states, such as, "start", "grow", "degenerate", "finish", "cancel", etc., wherein a current state of the lifecycle may be indicated by a lifecycle flag. In some implementations, one node in the CKG is a concept, which may correspond to one viewable or thinkable object. For example, "dog" is a viewable concept, while "economy" is a thinkable concept which may not have a viewable form but can be observed in an indirect way or thought in mind. Taking the CKG 500 as an example, nodes may include "Michelangelo", "David", "Poetry", "Rome, Papal States" and so on. In the CKG 500, the node "Michelangelo" is a major node, and other nodes are secondary nodes. In some implementations, one edge in the CKG is a relationship description between two nodes forming the edge, for example, a predicate-style or attribute-style relationship description. Taking the CKG 500 as an example, edges may include "Notable Work", "Known For", "Died/Place", "Portrait" and so on. For example, the edge "Notable work" between the nodes "Michelangelo" and "David" describes a relationship about that "David" is a notable work by "Michelangelo". Each edge and its corresponding secondary node may be in a "key-value" style. For example, assuming that the edge "Born/Date" is a key, then a value for this key may be "6 Mar. 1475", and this pair of edge and node may be represented as <Born/Date, 6 Mar. 1475>.

There are numerous heuristic-rules defined for extracting concept-based knowledge graph from various knowledge sources, e.g., webpages on websites. The knowledge sources may be classified into two types, one is in a well-formed style, e.g., webpages on Wikipedia, and another is in a plain text style. As for the knowledge sources in the well-formed style, information from these knowledge sources may be organized in a similar way with the construction of the CKG 500, and thus may easily form a CKG. As for the knowledge sources in the form of plain text, dependency parsing may be performed on the plain text. Syntactic structures of sentences in the plain text may be identified through dependency parsing, and then knowledge tuples may be extracted from dependency trees of the sentences. The knowledge tuples may further form a concept-based knowledge graph.

Figure 6:
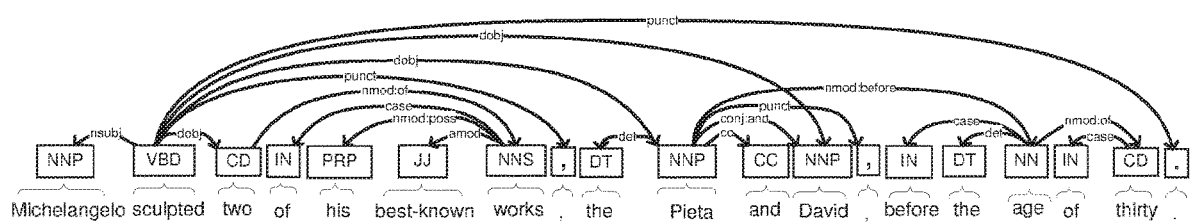
FIG. 6 illustrates an exemplary dependency parsing according to an embodiment.

FIG. 6 illustrates an exemplary dependency parsing 600 for extracting knowledge tuples from a dependency tree of a sentence according to an embodiment. The dependency parsing 600 is performed on an exemplary sentence "Michelangelo sculpted two of his best-known works, the Pieta and David, before the age of thirty". Dependency trees are obtained through performing the syntactic dependency parsing 600 on the sentence. Knowledge tuples may be extracted from the dependency tree of the sentence. The extracting process may follow dependency arcs which link predicates with arguments and link entities with syntactic relations.

The knowledge tuples that are extracted from the sentence in FIG. 6 may comprise: <Michelangelo, nsubj-sculpted-dobj, two of his best-known works>, <Michelangelo, nsubj-sculpted-dobj, the Pieta>, <Michelangelo, nsubj-sculpted-dobj, David>, etc. Herein, "nsubj" represents a "noun subjective argument" relationship between, such as, "Michelangelo" and "sculpted", and "dobj" represents a "direct object argument" relationship between, such as, "sculpted" and "David". Moreover, "the Pieta" and "David" are two concepts as nodes in the CKG. Through these links or relationships, connections between concepts may be built and such connections among concepts may be used for directing question-answering implementation, which may be taken as a special application of the CKG for information refining.

It should be appreciated that various dependency parsing techniques may be used here for performing the dependency parsing.

Figure 7:
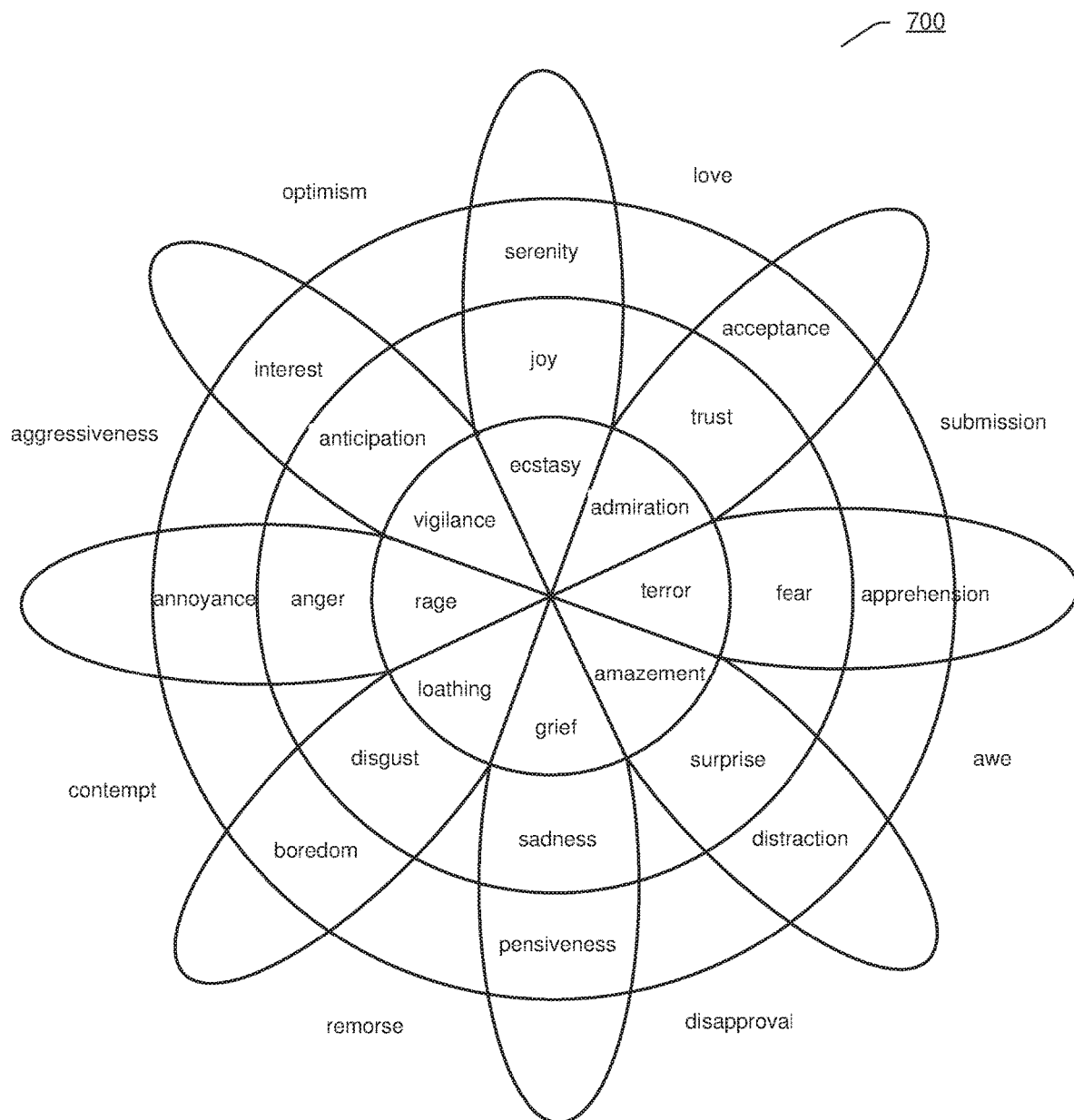
FIG. 7 illustrates an exemplary wheel of emotions according to an embodiment.

FIG. 7 illustrates an exemplary wheel of emotions 700 according to an embodiment. The wheel of emotions 700 defines an emotion set, which is also known as Plutchik' s wheel of emotions.

As shown in FIG. 7, eight "basic" emotions are defined, including: joy, trust, fear, surprise, sadness, disgust, anger and anticipation. Each basic emotion is defined with three strength levels, including "weak", "middle" and "strong". For example, as for the basic emotion "anger", an emotion with weak strength is "annoyance", an emotion of middle strength is "anger", and an emotion with strong strength is "rage". The emotion with weak strength and the emotion with strong strength may be viewed as variants of the corresponding basic emotion.

Moreover, eight "combined" emotions which do not have "strength" are also defined in FIG. 7, including: love, submission, awe, disapproval, remorse, contempt, aggressiveness and optimism. Each combined emotion is defined based on two adjacent basic emotions. For example, the combined emotion "love" is defined based on the basic emotion "joy" and the basic emotion "trust".

Therefore, there are total 32 types of emotions included in the wheel of emotions 700. However, it should be appreciated that the embodiments of the present disclosure are not limited to adopt the emotions in the emotion set 900, and any other types of emotion set defining more or less emotions may be also adopted.

Figure 8:
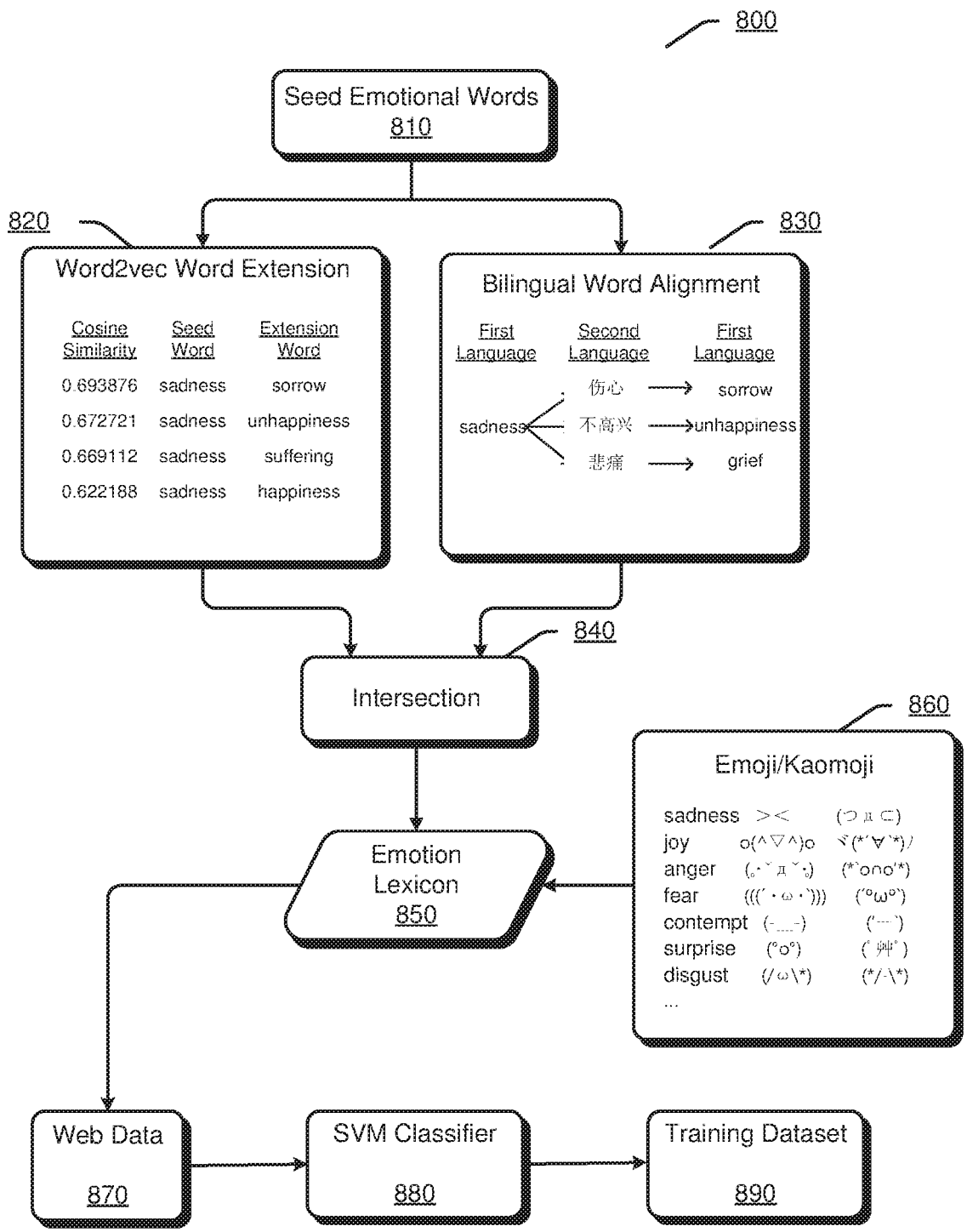
FIG. 8 illustrates an exemplary process for obtaining training dataset for emotion analysis according to an embodiment.

In order to train fine-grained classifying models, large-scale training dataset in a form of <text, emotion category> shall be obtained, wherein "emotion category" may refer to one of the 32 emotions in the wheel of emotions 700, or refer to one of the 8 basic emotions together with a corresponding strength level or one of the 8 combined emotions. FIG. 8 illustrates an exemplary process 800 for obtaining training dataset for emotion analysis according to an embodiment. The process 800 may be performed for generating an emotion lexicon by extending seed emotional words, and further determining a training dataset by using the emotion lexicon.

At 810, seed emotional words may be obtained. Herein, the seed emotional words may include emotional words corresponding to each of the 32 emotions. For example, the seed emotional words may include a plurality of words corresponding to the emotion "joy", such as, "happiness", "gladness", "pleasure", etc. The seed emotional words may be obtained from existing manually-constructed emotion lexicons that contain words with manually-labeled emotional polarities. These manually-constructed emotion lexicons can only provide a limited number of seed emotional words that are not enough for obtaining a training dataset for the emotion analysis.

At 820, a Word2vec word extension may be performed based on the seed emotional words so as to extend the seed emotional words. A Word2vec cosine similarity score for each seed emotional word and a word from a corpus may be computed. In this way, a number of words, from the corpus, with computed scores may be collected for each emotional word, and then a plurality of top-ranked words may be determined as extension to the seed emotional word. For example, as shown in FIG. 8, for the seed emotional word "sadness", extension words "sorrow", "unhappiness", "suffering", "happiness", etc. may be determined based on the computed Word2vec cosine similarity scores.

It should be appreciated that Word2vec cosine similarity score is computed based on, such as, positions of words in sentences. Thus, the Word2vec word extension cannot ensure that all the extension words have a similar semantic meaning with the corresponding seed emotional word. For example, in FIG. 8, "happiness" is determined as an extension word to the seed emotional word "sadness", however, these two words have different semantic meanings. Thus, the process 800 further comprises a pruning mechanism, which is based on bilingual word alignment, for removing those extension words having different semantic meanings or weak semantic relevance from corresponding seed emotional words.

At 830, bilingual word alignment may be performed. The bilingual word alignment may be used for finding semantically relevant words to a seed word through a round-trip translating between two different languages. A seed emotional word in a first language may be translated into words in a second language. For example, the seed emotional word "sadness" in English may be translated into words "伤心", "不高兴" and "悲痛" in Chinese. Then, the words in the second language may be translated back into words in the first language. For example, the words "伤 心", "不高兴" and "悲痛" in Chinese may be translated back into words "sorrow", "unhappiness" and "grief" in English. Thus, a list of words "sorrow", "unhappiness" and "grief" may be obtained through the bilingual word alignment for the seed emotional word "sadness".

At 840, an intersection operation may be performed on the extension words obtained by the Word2vec word extension at 820 and the word list obtained by the bilingual word alignment at 830. The intersection operation may be used for removing those extension words, obtained by the Word2vec word extension, having different semantic meanings or weak semantic relevance from corresponding seed emotional words. For example, in FIG. 8, through the intersection operation, the words "sorrow" and "unhappiness" may be retained, while the word "suffering" having weak semantic relevance from "sadness" and the word "happiness" having different semantic meanings from "sadness" are removed.

The retained words through the intersection operation may be appended to an emotion lexicon 850. In an implementation, words in the emotion lexicon 850 may be further added by corresponding emoticons, e.g., emoji or kaomoji. At 860, emoji or kaomoji may be collected from the network for each type of emotions. For example, for the emotion "sadness", its corresponding emoticons may include, such as, "><", "(つ д ⊂)", etc. Accordingly, these emoticons may be appended to the words "sadness", "sorrow" and "unhappiness" corresponding to the emotion "sadness" in the emotion lexicon 850.

As discussed above, the emotion lexicon 850 is established by performing Word2vec word extension and bilingual word alignment on seed emotional words, and may include much more words than the manually-constructed emotion lexicons. The emotion lexicon 850 may be used for crawling, from web data 870, text sentences that contain at least one word in the emotion lexicon 850. These crawled text sentences may be used as candidate training data.

In some cases, the candidate training data may comprise some interference sentences that have obscure emotions or are difficult to identify emotions. An exemplary interference sentence may comprise a word "not" or its equivalents, which may switch from an original emotion to a contrary emotion. Another exemplary interference sentence may comprise both positive words and negative words in a mixture way, such as, "praise first and then criticize". Moreover, in some cases, there may be a gap between the "strength" of one seed emotional word and the "strength" of one sentence that contains the seed emotional word. That is, the sentence is not ensured to follow exactly the same strength of the seed emotional word. For example, for the seed emotional word "anger", the strength of "anger" is "middle". However, in a sentence alike "he was extremely angry, and he put the trigger of the gun", the emotion of the total sentence should be annotated as "strong" anger, i.e., an emotion "rage" which has a strong strength, instead of the emotion "anger" which only has a middle strength. Besides, a seed emotional word may extend some new synonym words that make its strength to be changed from the original seed emotional word.

To alleviate the above problems, a support vector machine (SVM) classifier 880 may be used for filtering out interference sentences from the candidate training data or correcting improper emotion annotations of some candidate training data. The SVM classifier 880 may use trigram characters as features. A set of seed training data may be obtained for training the SVM classifier 880. For example, the seed training data may comprise 1,000 manually-annotated instances for each emotion 8. In one case, a sentence in an instance may be annotated by one of the 8 basic emotions or one of the 8 combined emotions, and if one basic emotion is annotated, a strength level shall be further annotated. In another case, a sentence in an instance may be annotated directly by one of the 32 emotions in the wheel of emotions 700.

The SVM classifier 880 may make a secondary judgment to the candidate training data obtained based on the emotion lexicon 850. Through the operation of the SVM classifier 880, those sentences having a relatively high confidence probability in the candidate training data may be finally appended to a training dataset 890. The training dataset 890 may be used for training the emotion classifying models.

It should be appreciated that the operation of Word2vec synonym extension at 820, the operation of appending emoticons at 860 and the operation by the SVM classifier 880 are all optional in the process 800. Thus, in other implementations, any one or more of these operations may be omitted from the process 800.

Figure 9:
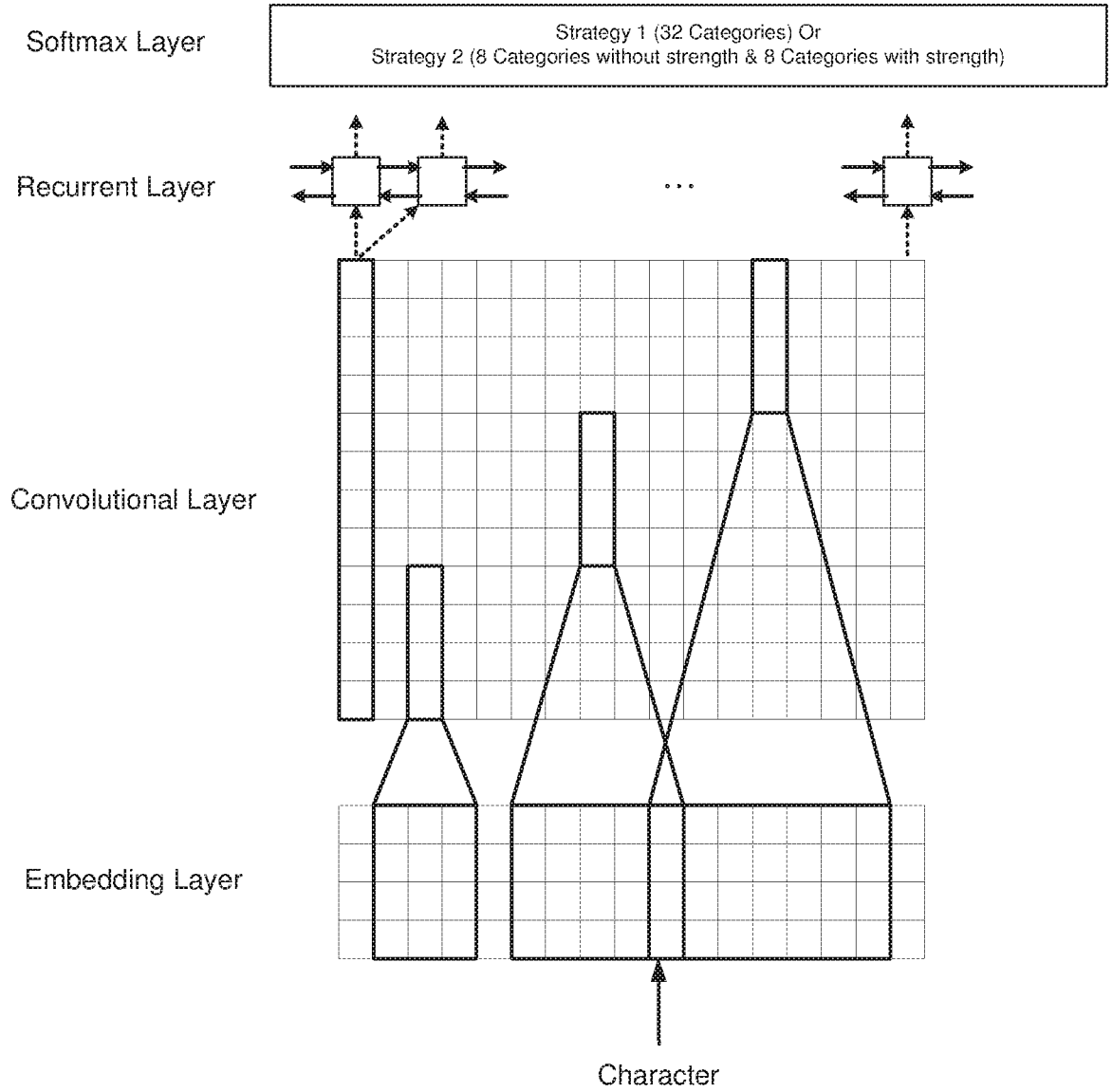
FIG. 9 illustrates an exemplary neural network structure for a text to emotion classifier according to an embodiment.

FIG. 9 illustrates an exemplary neural network structure 900 for a text to emotion classifier according to an embodiment.

The neural network structure 900 may comprise a character-level Recurrent Convolutional Neural Network (RCNN). The character-level RCNN is capable of encoding both semantic and orthographic information from characters, and may comprise an embedding layer, a convolutional layer, a recurrent layer and an output layer. It should be appreciated that, as for text sentences in a character-style language, e.g., Japanese, Chinese, etc., characters in the sentences may be taken as basic units for embedding, while as for text sentences in a word-style language, e.g., English, words in the sentences, instead of letters, may be taken as basic units for embedding. When the basic units in the embedding layer are "characters", the convolutional layer is to find the best combinations of words each of which is combined by several characters. When the basic units in the embedding layer are "words", the convolutional layer is to find the best combinations of phrases each of which is combined by several words. Although the following discussion aims at the case of "character", similar technical means may also be applied for the case of "word".

The embedding layer may convert a text sentence into a dense vector space, e.g., generating a vector for each character in the sentence.

The convolutional layer may be based on a CNN, and may perform convolution operations on the vectors from the embedding layer, e.g., converting the vectors with various kernel sizes.

Let $Q \in \mathbb{R}^{d^* \times |V|}$ be a character embedding matrix with d being the dimensionality of character embedding and V being a character vocabulary set. It is assumed that a word $w=c_1, \ldots c_l$, which has l characters $c_j$. Then, a character-level representation of w is given by a matrix $C^w \in \mathbb{R}^{d^* \times l}$, where the j-th column of $C^w$ corresponds to a character embedding for $c_j$ which is further the j-th column of Q. A narrow convolution is applied between $C^w$ and a filter or convolutional function $H \in \mathbb{R}^{d^* \times f}$ with a width $f^w$ FIG. 9 shows three exemplary filters with widths f=3, 5 and 7. Then, a bias is added, and a nonlinearity transformation is applied to obtain a feature map $f^w \in \mathbb{R}^{l-f+1}$. The i-th element of $f^w$ may be given as:

$$f^w[i] = \tan h(<C^w[*, i:i+f-1], H> + b) \quad \text{Equation (1)}$$

where $C^w[*, i:i+f-1]$ is the i-to-(i+f−1)-th columns of $C^w$, and $<A, B>=\text{Tr}(AB^T)$ is a Frobenius inner product.

In an implementation, the CNN at the convolutional layer may adopt, such as, a max pooling over time.

The recurrent layer may perform recurrent operations on outputs of the convolutional layer. It should be appreciated that, although FIG. 11 shows bidirectional recurrent operations in the recurrent layer, unidirectional recurrent operations may also be applied in the recurrent layer. The recurrent layer may also be referred to as a recurrent neural network (RNN) layer, which may adopt long-short term memory (LSTM) units. The LSTM may address a learning problem of long distance dependencies and a gradient vanishing problem, through augmenting a traditional RNN with a memory cell vector $c_t \in \mathbb{R}^n$ at each time step. One step of the LSTM takes $x_t, h_{t-1}, c_{t-1}$ as inputs and produces $h_t, c_t$ via the following intermediate calculations:

$$i_t = \sigma(W^i x_t + U^i h_{t-1} + b^i) \quad \text{Equation (2)}$$

$$f_t = \sigma(W^f x_t + U^f h_{t-1} + b^f) \quad \text{Equation (3)}$$

$$o_t = \sigma(W^o x_t + U^o h_{t-1} + b^o) \quad \text{Equation (4)}$$

$$g_t = \tan h(W^g x_t + U^g h_{t-1} + b^g) \quad \text{Equation (5)}$$

$$c_t = f_t \otimes c_{t-1} + i_t \otimes g_t \quad \text{Equation (6)}$$

$$h_t = o_t \otimes \tan h(c_t) \quad \text{Equation (7)}$$

where $\sigma(.)$ and $\tan h(.)$ are elementwise sigmoid and hyperbolic tangent functions, $\otimes$ is an elementwise multiplication operator, and $i_t, f_t, o_t$ denote input gate, forget gate and output gate respectively. When t=1, $h_0$ and $c_0$ are initialized to zero vectors. Parameters to be trained in the LSTM are the matrices $W^j, U^j$, and the bias vector $b^j$, where $j \in \{i, f, o, g\}$.

The output layer may be configured for passing RNN states from the recurrent layer to a softmax layer in the neural network structure 900.

The softmax layer may be configured for different emotion classifying strategies. In a first strategy, emotion categories may be defined based on 32 emotions in the wheel of emotions 700, including 8 basic emotions with "middle" strength, 8 weak emotions, 8 strong emotions and 8 combined emotions. The softmax layer may be a full connection layer which outputs an emotion vector corresponding to the 32 emotion categories. In a second strategy, emotion categories may be defined based on a combination of emotion and strength. For example, according to the wheel of emotions 700, 8 basic emotions and 8 combined emotions may be defined, wherein each of the 8 basic emotions is further defined with a strength level, while the 8 combined emotions are not defined with any strength level. In this case, the softmax layer may be a full connection layer which outputs an emotion vector corresponding to the 8 basic emotions, strength levels of the 8 basic emotions, and the 8 combined emotions. For both the first and second strategies, the emotion vector output by the softmax layer may be construed as emotion information of the input text sentence.

The neural network structure 900 may be used for performing emotion analysis on text sentences. For example, when obtaining a text document, the chatbot may perform emotion analysis on sentences in the text document through the neural network structure 900 so as to obtain emotion information of the text document and further derive an emotion category of the text document.

According to the embodiments of the present disclosure, lifecycles of topics in a conversation session may be determined. Lifecycle of each topic may be classified into a plurality of latent time-sensitive states. A topic may be appended with a lifecycle flag to indicate a current state of the topic, for example, "start", "grow", "degenerate", "finish", "canceled", "post-discussion", etc. These states may be transformed from one state to another. In an implementation, emotion category of the topic may be determined through performing emotion analysis on the current session log associated with the topic. Depending on whether the emotion category is changed to positive or negative, the current state of the topic may be transformed accordingly.

Next, two exemplary scenarios in the conversation session between the user and the chatbot will be provided for describing lifecycles of topics that are in a form of <topic, state>.

Exemplary Scenario 1:
User: "I am feeling lonely."
Chatbot: "How about watching a movie?" <topic=watching a movie, state=begin>
User: "Sure, any suggestions?" <topic=watching a movie, state=extension>
Chatbot: "How about the latest one of 'Spiderman'?" <topic=Spiderman, state=begin; parent topic=watching a movie, state=extension>
User: "Sounds good." <topic=Spiderman, state=positive intention; parent topic=watching a movie, state=extension>

Chatbot: "A nearest cinema is 10 minutes away and the next show is in 30 minutes. Do you need to buy a ticket?" <topic=ticket, state=begin; parent topic=Spiderman, state=positive intention; 2$^{nd}$ parent topic=watching a movie, state=extension>

User: "Sure. Please buy one ticket."

{one day later}

User: "The movie was interesting." <topic=Spiderman, state=finish and positive comment; parent topic=watching a movie, state=finished>

In this exemplary scenario, the topic of "watching a movie" is determined by the chatbot based on the CKG, for example, based on a tuple <watching a movie, cure, lonely> in the CKG which is in a form of <concept, relationship, concept>.

Exemplary Scenario 2:

User: "I am feeling lonely."

Chatbot: "How about watching a movie?" <topic=watching a movie, state=begin>

User: "Not that interested." <topic=watching a movie, state=negative intention>

Chatbot: "Then how about a blue style music?" <topic=blue style music, state=begin>

User: "Sounds good." <topic=blue style music, state=positive intention>{music plays here}

User: "I like it." <topic=blue style music, state=finish and positive comment>

Chatbot: "I am glad that you like it."

In this exemplary scenario, the topic of "blue style music" is determined by the chatbot based on the CKG, for example, based on a tuple <blue style music, allies with, lonely> in the CKG. Additionally or alternatively, the current state of the topic may be determined based on the change of intention or emotion of the user for the topic.

In some implementations, topics may be determined by searching a pre-constructed CKG based on a semantic similarity-based linking between the topic and concepts in the CKG. A Gradient Boosting Decision Tree (GBDT) may be adopted for the linking by assigning similarity scores to candidate concepts in the CKG and using at least three types of features. For example, one type of feature is surface n-gram character/word/phrase based similarity scores; a second type of feature is computed based on synonym lexicons, such as the WordNet; and a third type of feature is latent semantic similarity scores, in which latent semantic information is obtained by using neural network language models that are trained from contextual information. A feature list is provided below as an example for evaluating the similarity between a topic t and a concept c in the CKG:

Character-based edit distances between t and c;

Word-based edit distances between t and c;

The number of the same 3-gram characters divided by the number of 3-gram characters in t;

The number of the same 2-gram words divided by the number of 2-gram words in t;

The number of the same 2-gram words divided by the number of 2-gram words in c;

Whether there is synonym relation in WordNet between t and c;

The distance that t can reach to c or vice versa in the WordNet; and

Cosine similarity score between dense space vectors of t and c yielded by word2vec.

The chatbot may adopt the topic determination and the lifecycle classification of the topics as discussed above to guide generation of a next response and summarize headlines of a long period of conversation session.

The embodiments of the present disclosure may adopt a hierarchical RNN for classifying lifecycles of topics in a conversation session. The RNN may encode the session into vectors, and further project the encoded vectors to a list of probabilities of states of each topic through, e.g., a softmax function.

Figure 10:
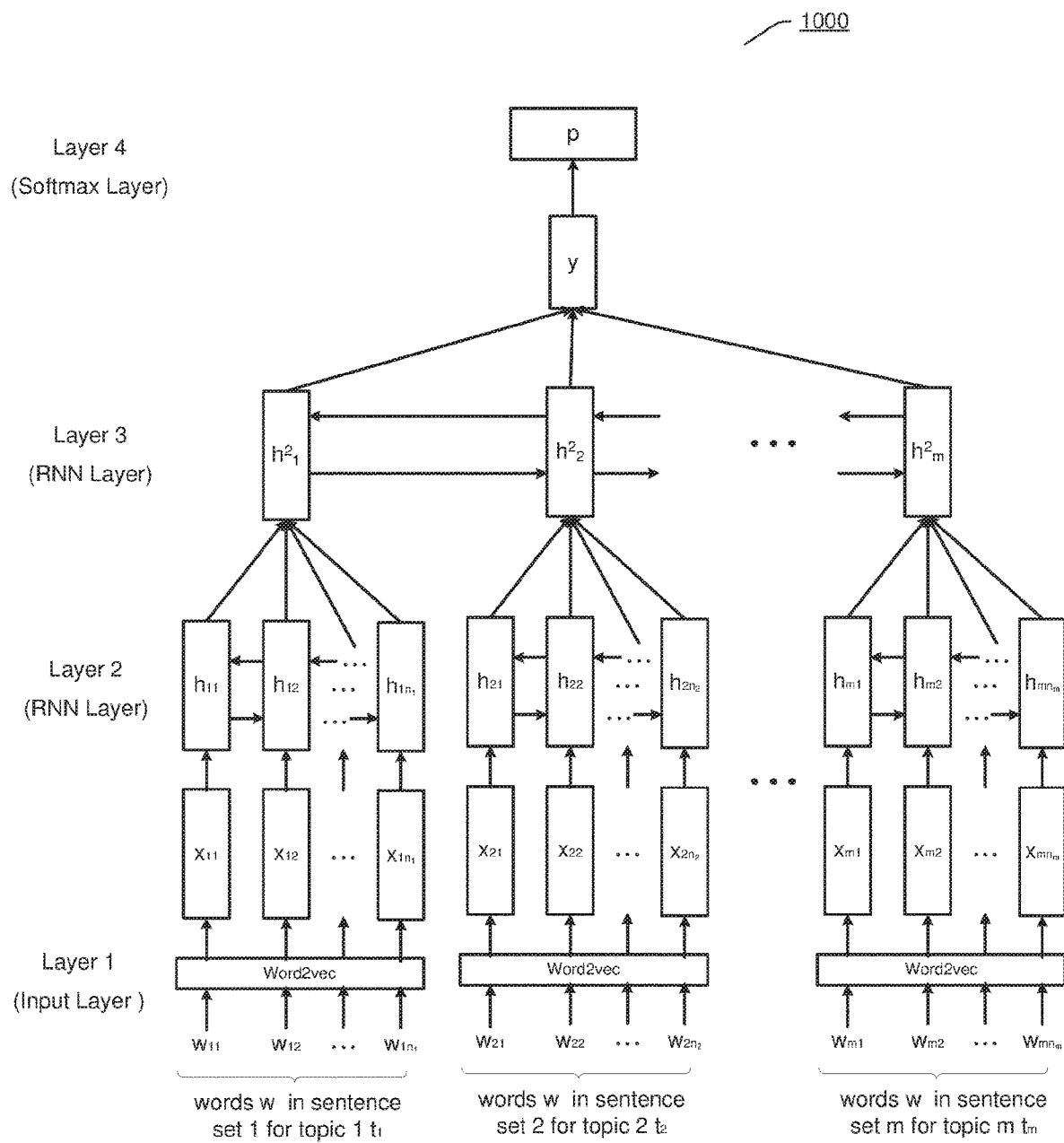
FIG. 10 illustrates an exemplary structure for classifying lifecycles of topics in a conversation session according to an embodiment.

FIG. 10 illustrates an exemplary structure 1000 for classifying lifecycles of topics in a conversation session according to an embodiment. The structure 1000 comprises a multiple-layer neural network, e.g., a four-layer neural network, wherein rectangles may represent vectors and arrows may represent functions, such as matrix-vector multiplication.

Layer 1 is an input layer. It is assumed that, in Layer 1, there are m sentence sets for m topics from an input session. A group of vectors may be generated in Layer 1, each vector $x_t$ being a Word2vec style embedding of a word in a sentence in one of the m sentence sets. Each sentence in the sentence sets may be attached with a topic word indicating that the topic word is included in this sentence.

Layer 2 is a bi-directional RNN layer for performing recurrent operations among words of sentences corresponding to the same topic. The purpose of Layer 2 is to convert a whole sentence set into a vector. A vector $h_{t+1}$ in Layer 2 may be computed by linearly combining $h_t$ and $x_t$ and attaching an element-wise non-linear transformation function such as RNN(.). Although RNN(.) is adopted here, it should be appreciated that the element-wise non-linear transformation function may also adopt, e.g., tanh or sigmoid, or a LSTM/GRU computing block.

It is assumed that T is the number of steps to unroll the RNN Layer 2 and $h_T$ is a final vector. Considering that recurrent operations are performed in two directions, i.e., left-to-right and right-to-left, $h_T$ may be formed by a concatenation of vectors in the two directions, for example, $h_T=[h_{left-to-right}, h_{right-to-left}]^T$.

Layer 3 is another bi-directional RNN layer for performing recurrent operations among m topics in the session. The purpose of Layer 3 is to obtain a dense vector representation of the whole session. The bi-directional RNN Layer 3 takes $h_T$ from Layer 2 as inputs. The output of Layer 3 may be denoted as $h_m^2$, where m is the number of sentence sets in the input session.

Layer 4 is an output layer. Layer 4 may be configured for determining probabilities of possible states of each topic in a pre-given state list, e.g., a lifecycle state list for one topic. A topic word may correspond to a list of probability $p_i$, where i ranges from 1 to the number of states |P|. Process in this layer may comprise firstly computing y which is a linear function of $h_m^2$, and then using a softmax function to project y into a probability space and ensure $P=[p_1, p_2, \ldots, p_{|P|}]^T$ follows a definition of probability. For error back-propagation, cross-entropy loss which corresponds to a minus log function of P for each topic word may be applied.

The above discussed structure 1000 is easy to be implemented. However, gradient will vanish as T grows bigger and bigger. For example, gradients in (0, 1) from $h_T$ back to $h_1$ will gradually close to zero, making Stochastic Gradient Descent (SGD)-style updating of parameters infeasible. Thus, in some implementations, to alleviate this problem occurred when using simple non-linear functions, e.g., tanh or sigmoid, other types of functions for expressing $h_{t+1}$ by $h_t$ and $x_t$ may be adopted, such as, Gated Recurrent Unit (GRU), Long Short-Term Memory (LSTM), etc.

Taking LSTM as an example, the LSTM may address a learning problem of long distance dependencies and a gradient vanishing problem, through augmenting a traditional RNN with a memory cell vector $c_t \in \mathbb{R}^n$ at each time step. One step of the LSTM takes $x_t$, $h_{t-1}$, $c_{t-1}$ as inputs and produces $h_t$, $c_t$ via the previous defined Equation (2)-Equation(7).

According to the embodiments of the present disclosure, a neural network with attention model may be adopted for generating a summary of a text document.

Figure 11A:
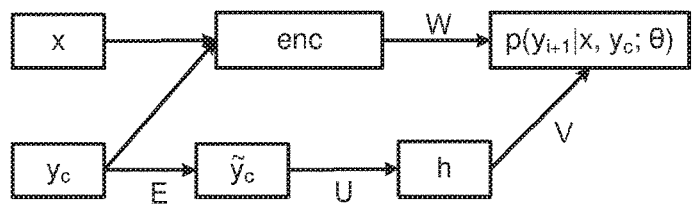
FIG. 11A illustrates an exemplary neural network language model according to an embodiment.

FIG. 11A illustrates an exemplary neural network language model (NNLM) 1110 according to an embodiment. The NNLM 1110 may be used for generating a summary of a text document. The NNLM 1110 adopts encoder-decoder structure, which includes an attention-based encoder.

The NNLM 1110 takes x as an input document, which comprises a fact vector of the input document and an emotion vector of the input document. $y_c$ may be regarded as an output with a window size of c. The NNLM 1110 is adapted from a standard feed-forward NNLM and may be utilized for estimating a contextual probability of a next word in the summary. The NNLM 1110 may be formulated as followings:

$$p((y_{i+1}|y_c,x;\theta)) \propto \exp(V_h + W_{enc(x,y_c)}) \quad \text{Equation (8)}$$

$$\tilde{y}_c = [E_{y_{i-c+1}}, \ldots, E_{y_i}] \quad \text{Equation (9)}$$

$$h = \tan h(U\tilde{y}_c) \quad \text{Equation (10)}$$

where $\theta=(E, U, V, W)$, $E \in \mathbb{R}^{D*V}$ is a word embedding matrix, each word with D dimensions, $U \in \mathbb{R}^{(CD)*H}$, $V \in \mathbb{R}^{V*H}$, $W \in \mathbb{R}^{V*H}$ are weight matrices, and h is a hidden layer of size H. The black-box function unit enc is a contextual encoder which returns a vector of size H representing input and current output context.

Figure 11B:
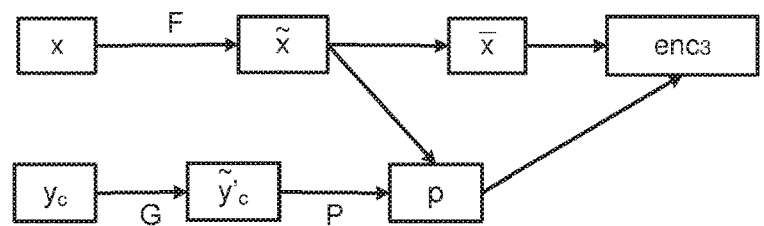
FIG. 11B illustrates an exemplary attention-based encoder according to an embodiment.

FIG. 11B illustrates an exemplary attention-based encoder 1120 according to an embodiment. The attention-based encoder 1120, denoted as $enc_3$, is formulized as:

$$enc_3(x,y_c) = p^T \tilde{x} \quad \text{Equation (11)}$$

$$p \propto \exp(\tilde{x}P\tilde{y}'_c) \quad \text{Equation (12)}$$

$$\tilde{x} = [Fx_1, \ldots, Fx_m] \quad \text{Equation (13)}$$

$$\tilde{y}'_c = [G_{y_{i-C+1}}, \ldots, G_{y_i}] \quad \text{Equation (14)}$$

$$\forall_i \tilde{x}_i = \Sigma_{q=i-Q}^{i+Q} \tilde{x}_i/Q \quad \text{Equation (15)}$$

where $F \in \mathbb{R}^{D*V}$ is the embedding of the input, $G \in \mathbb{R}^{D*V}$ is an embedding of the output context, $P \in \mathbb{R}^{H*(CD)}$ is a new weight matrix parameter mapping between the context embedding and input embedding, and Q is a smoothing window.

The major part in the attention-based encoder may be to learn a soft alignment P between the input x and the output y. The soft alignment may be used for weighting the smoothed version of the input x when constructing a representation. For example, if the current context aligns well with the position i, then the words $x_{i-Q}, \ldots, x_{i+Q}$ are highly weighted by the encoder.

During training, a negative log-likelihood (NLL) may be used as target function as follows:

$$NLL(\theta) = -\sum_{j=1}^{J} \log p(y^{(j)}|x^{(j)};\theta) \quad \text{Equation (16)}$$

$$= -\sum_{j=1}^{J} \sum_{i=1}^{N-1} \log p(y_{i+1}^{(j)}|x^{(j)}, y_c; \theta)$$

wherein, NLL may be minimized by using mini-batch stochastic gradient descent.

A beam-search decoder may be adopted in the decoding process. The beam-search decoder may maintain the full vocabulary V while limiting itself to K potential hypotheses at each position of the summary generation process, wherein $$y^* = \underset{y \in Y}{\mathrm{argmax}} \sum_{i=0}^{N-1} g(y_{i+1}, x, y_c) \quad \text{Equation (17)}$$

The embodiments of the present disclosure may perform emotion analysis on image.

Figure 12:
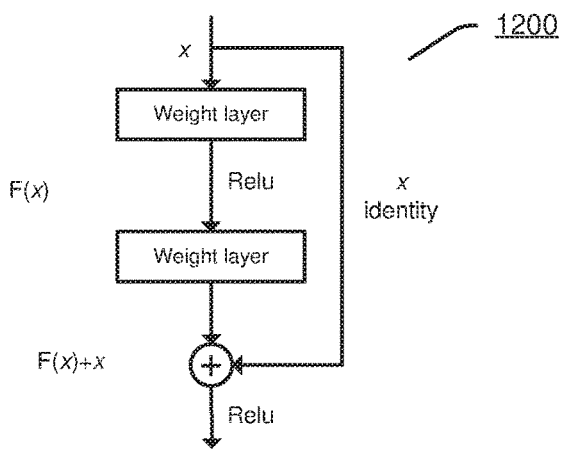
FIG. 12 illustrates an exemplary residual learning block for image encoding according to an embodiment according to an embodiment.

Deep neural networks may be adopted for projecting an image into a dense vector. For example, a residual network (ResNet) may be adopted for encoding the image. The ResNet may comprise a plurality of residual learning blocks. FIG. 12 illustrates an exemplary residual learning block 1200 for image encoding according to an embodiment.

Formally, as for an input x, a desired underlying mapping may be denoted as H(x), and stacked nonlinear layers may fit another mapping of F(x) :=H(x)−x. An original mapping may be recast into F(x)+x. It is hypothesized that it is easier to optimize residual mapping than to optimize original unreferenced mapping. To the extreme, if an identity mapping were optimal, it would be easier to push a residual to zero than to fit the identity mapping by a stack of nonlinear layers. The non-linear active function is a rectified linear unit (relu), which may denote rectified linear unit and may be defined as: Relu(x)=max(0, x).

Figure 13:
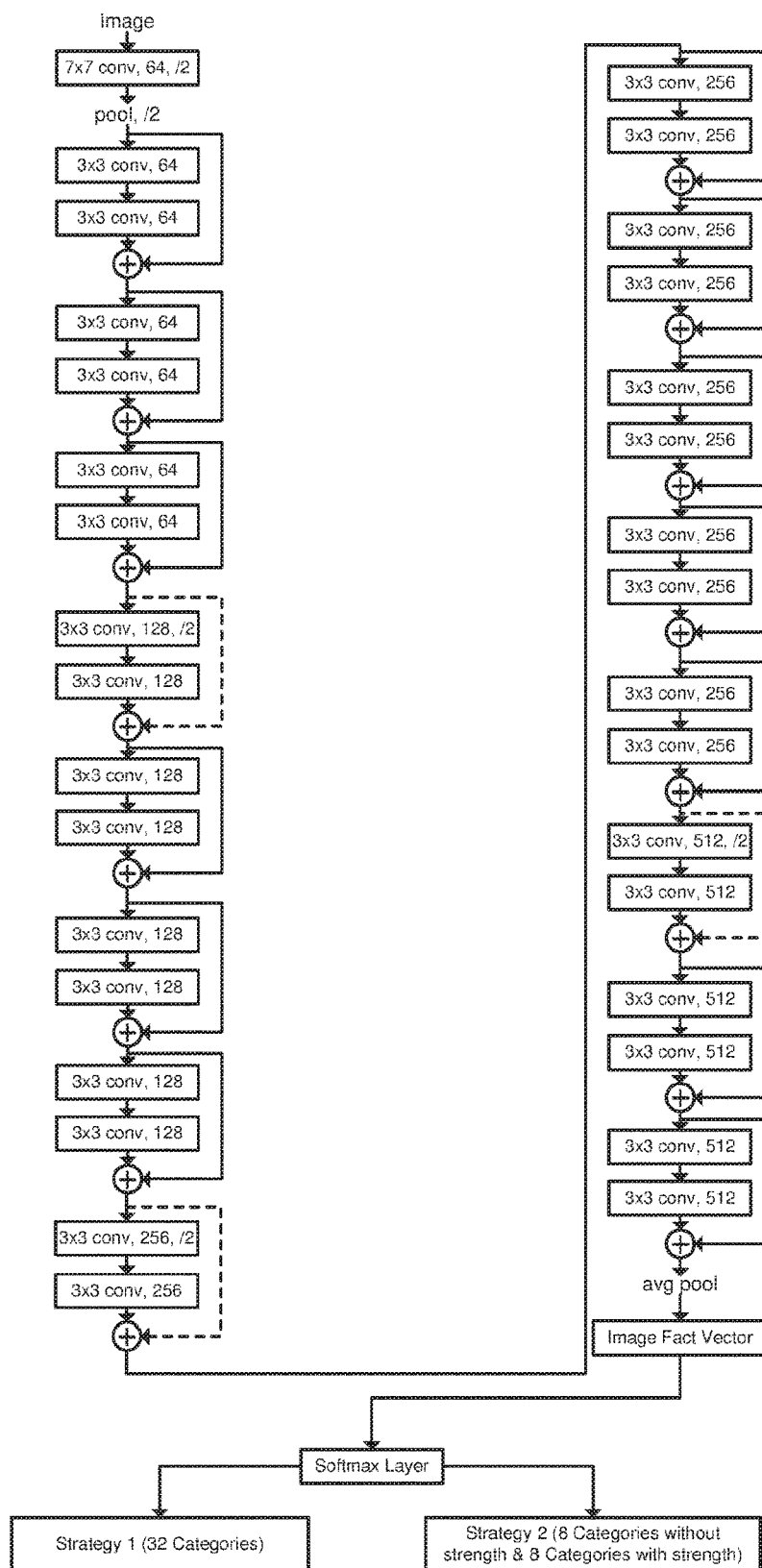
FIG. 13 illustrates an exemplary neural network structure for an image to emotion classifier according to an embodiment.

Based on the residual learning block shown in FIG. 12, a residual network (ResNet) may be established. FIG. 13 illustrates an exemplary neural network structure 1300 for an image to emotion classifier according to an embodiment. The neural network structure 1300 may have an exemplary 34 layer ResNet for encoding an image, which may provide a relative good accuracy and fast training/testing.

In FIG. 13, for example, "3*3 conv, 64" denotes that there are 64 filters, and each filter has a convolutional kernel or function and is in a scale of 3*3 pixels. "/2" denotes a double stride. "pool" denotes a pooling operation, and "avg pool" denotes an average pooling operation. Output of the average pooling operation is an image fact vector which is a dense vector representation of the input image.

The image fact vector may be further provided to a softmax layer which is configured according to different emotion classifying strategies. The softmax layer in FIG. 13 may function in a similar way with the softmax layer in FIG. 9. For example, the softmax layer in FIG. 13 may output an emotion vector corresponding to the 32 emotions, or output an emotion vector corresponding to the 8 basic emotions, strength levels of the 8 basic emotions, and the 8 combined emotions. The emotion vector outputted by the softmax layer may be construed as emotion information of the input image.

The neural network structure 1300 may be used for performing emotion analysis on images. For example, when obtaining an image document, the chatbot may perform emotion analysis on images in the image document through the neural network structure 1300 so as to obtain emotion information of the image document and further derive an emotion category of the image document.

It should be appreciated that the ResNet is an exemplary technique that can be adopted in image encoding, and any other techniques may be adopted in image encoding, such as, AlexNet, GoogleNet, VGG-Net, etc.

In some embodiments, RoIs of an image may be identified, and the neural network structure 1300 may further perform emotion analysis on the RoIs to obtain emotion information of the RoIs. Herein, "RoI" may refer to a face region in an image including a face picture. In some cases, an image may include more than one person, and these persons may have respective emotions. For example, assuming that there are two persons in an image, one person is crying, and the other person is calm and trying to communicate with the crying person. Apparently, face regions of these two persons may represent different emotions. It would be beneficial for understanding what emotion does the total image have, if these two face regions can be identified and an emotion of each face region can be determined.

Figure 14:
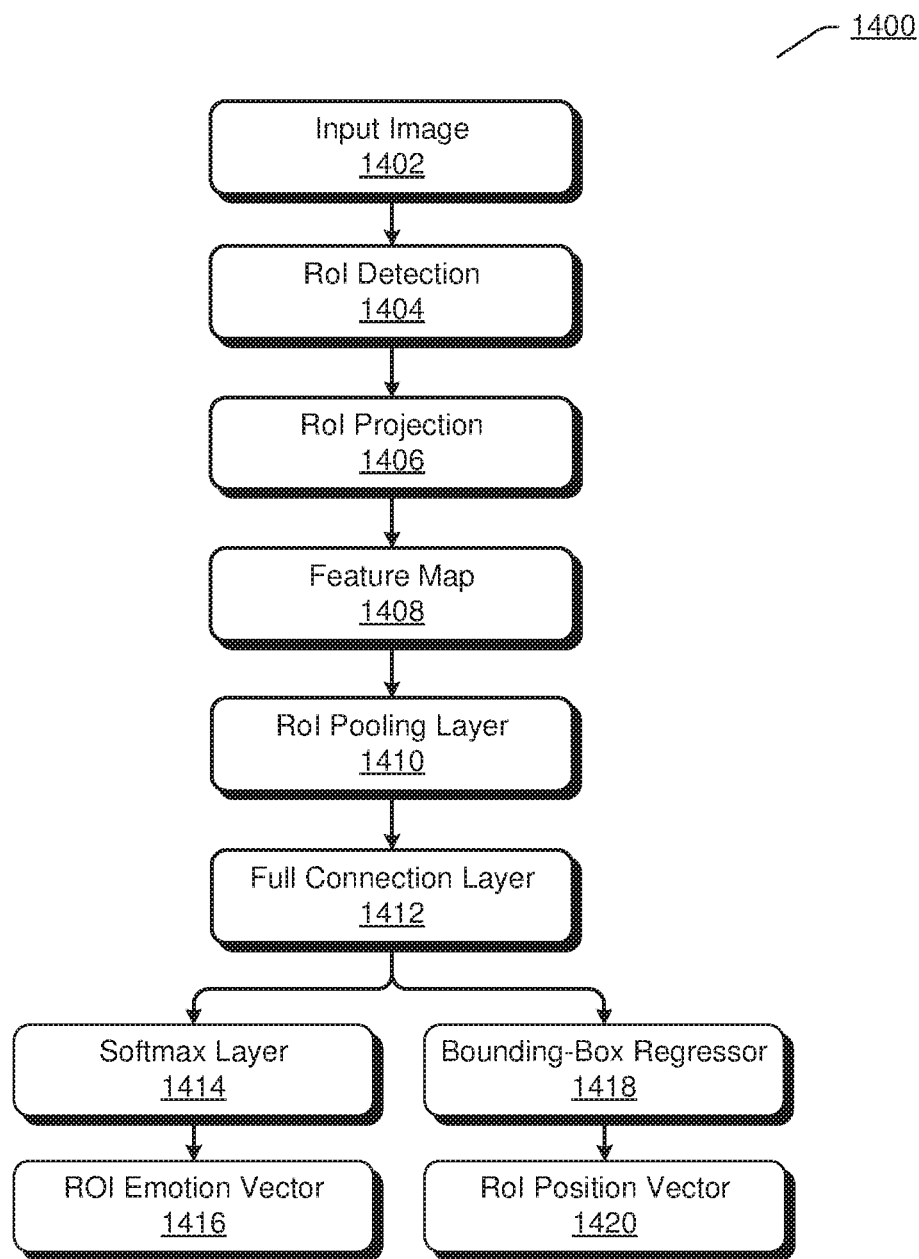
FIG. 14 illustrates an exemplary process for performing emotion analysis on a region of interest (ROI) of an image according to an embodiment.

FIG. 14 illustrates an exemplary process 1400 for performing emotion analysis on a RoI of an image according to an embodiment.

At 1402, an input image may be obtained. At 1404, at least one RoI may be detected from the input image. At 1406, the RoI may be projected into a feature map 1408 through, such as, the ResNet shown in FIG. 13. Then, at 1410, a RoI pooling layer may be used for performing, such as, max pooling on the feature map 1408 so as to convert the feature map 1408 into a small feature map. For example, assuming that the RoI is a h×w rectangular window, this RoI window may be divided into (h/H)×(w/W) sub-windows, and the RoI pooling layer may perform max pooling on values in each sub-window and output a small feature map with a size of H×W. The parameters H and W may be layer hyper-parameters that are independent of any particular RoI. At 1412, the small feature map may be provided to at least one full connection layer which connects to two branches. One branch is to a softmax layer 1414, which may be the same as the softmax layer in FIG. 13 and output an emotion vector 1416 of the RoI. Another branch is to a bounding-box regressor 1418, which may output a RoI position vector 1420 indicating coordinates of a top left corner of the RoI and coordinates of a bottom right corner of the RoI.

In an implementation, emotion vectors of RoIs in an image and an emotion vector of the total image may be combined together as emotion information of the image.

In order to train the image-to-emotion classifying model, large-scale training dataset in a form of <image, emotion category> shall be obtained. In an implementation, the emotion lexicon 850 in FIG. 8 may be sent to a text-based image searching engine, so as to collect a plenty of images associated with emotional words and/or their strength levels as included in the emotion lexicon. The collected images together with corresponding emotion words and/or their strength levels may be manually judged as "match" or "not match". If there are more than one face occurred in an image, and a "match" judgment has been given for this image, then a RoI, e.g., face region, in the image, which aligns with the emotional word and/or its strength level, may be further manually drawn in the image. The above process for obtaining training dataset may simplify the annotation task and make human level judgment to be easier.

The embodiments of the present disclosure may perform an image-to-text conversion which can generate text from image.

Figure 15:
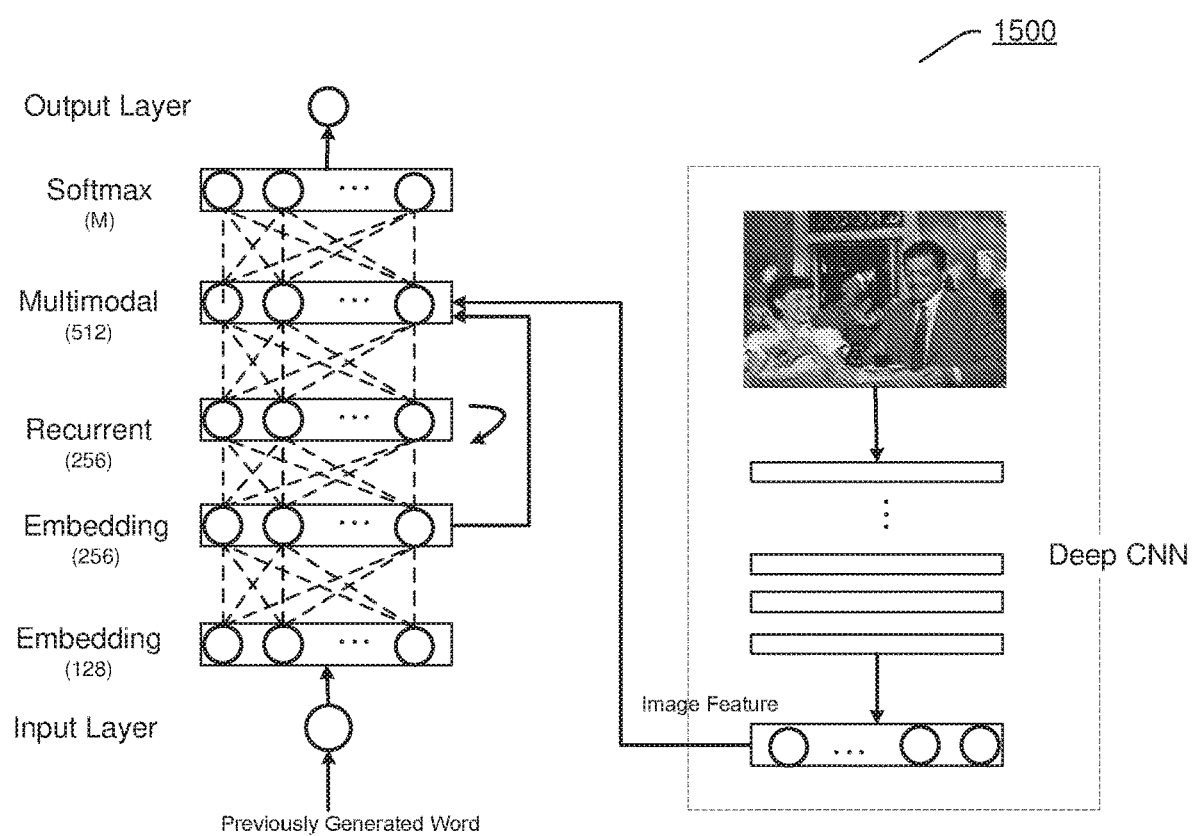
FIG. 15 illustrates an exemplary neural network for generating text from image according to an embodiment.

FIG. 15 illustrates an exemplary neural network 1500 for generating text from image according to an embodiment. The neural network 1500 is based on a CNN-RNN framework, wherein the deep CNN in the right part of FIG. 15 may be used for obtaining a fact vector of an input image, and the RNN in the left part of FIG. 15 may be used for generating a text sentence. The deep CNN in FIG. 15 may be based on the ResNet in FIG. 13. The fundamental idea of the neural network 1500 is to match an image and a text sentence in a latent semantic space, wherein the image is projected into a dense vector space through the deep CNN and the sentence is projected into another dense vector space through the RNN.

Training data for the neural network 1500 may be in a form of <image, text>. For example, an image in the film "Roman Holiday" and a text sentence of "Ann and Joe are drinking together" which describes the image may be used as an instance of training data, wherein the image representation is provided to the deep CNN and the text sentence is provided to the RNN. In some cases, sentences in the training data may be broken into words, and all the words may be extracted to form a vocabulary set. Then, words from different sentences may be recombined based on clues from an input image to form a new sentence which is optimized to fit the input image based on generation probabilities.

The sentence generation process of the neural network 1500 may work as follows. The fact vector I of the input image is provided to a multimodal layer of the RNN. A softmax layer may compute probabilities of words in a target vocabulary set, and select at least one word with the maximum probability. In an implementation, beam search may be used for keeping record of the top-B candidate words, wherein B is the beam size. For example, when B is 3, it means that the first 3 words that have the highest probabilities are kept record in the softmax layer.

One or more previously generated words $\{w_1, w_2, w_{t-1}\}$ may be input through an input layer of the RNN. A vector w(t) may be obtained through embedding layers 1 and 2 of the RNN. A vector r(t) may be obtained through a recurrent layer of the RNN. The vectors w(t) and r(t) together with the fact vector I of the input image may be provided to the multimodal layer as three input vectors. These three input vectors may be added together at the multimodal layer through:

$$m(t)=g(V_w*w(t)+V_r*r(t)+V_I*I) \qquad \text{Equation (18)}$$

wherein, "+" denotes element-wise addition, m denotes the multimodal layer feature vector, g(x) is an element-wise scaled hyperbolic tangent function, and $g(x)=1.7159* \tanh(2x/3)$. The function g(x) forces gradients into the most non-linear value range and leads to a faster training process than a basic hyperbolic tangent function.

Based on outputs from the multimodal layer, the softmax layer will select a next word or top-B possible next words from the vocabulary set.

The above generating process may be iteratively performed, and may stop as far as a </s> symbol which denotes the ending of a text sentence.

It should be appreciated that, in some implementations, emotion category of the input image may also be considered in the sentence generating process in FIG. 15. In this case, the vector I of the input image involved in the above discussion may become a combination of the fact vector of the input image and an emotion vector of the input image. Accordingly, the generated text sentence by the neural network 1500 may be an emotional description or comment on the input image. For example, if the input image is about a person who is crying, then the generated text sentence may be alike "This painting tells a sad story" which contains emotional expression indicating the emotion "sadness" conveyed by the image.

Figure 16:
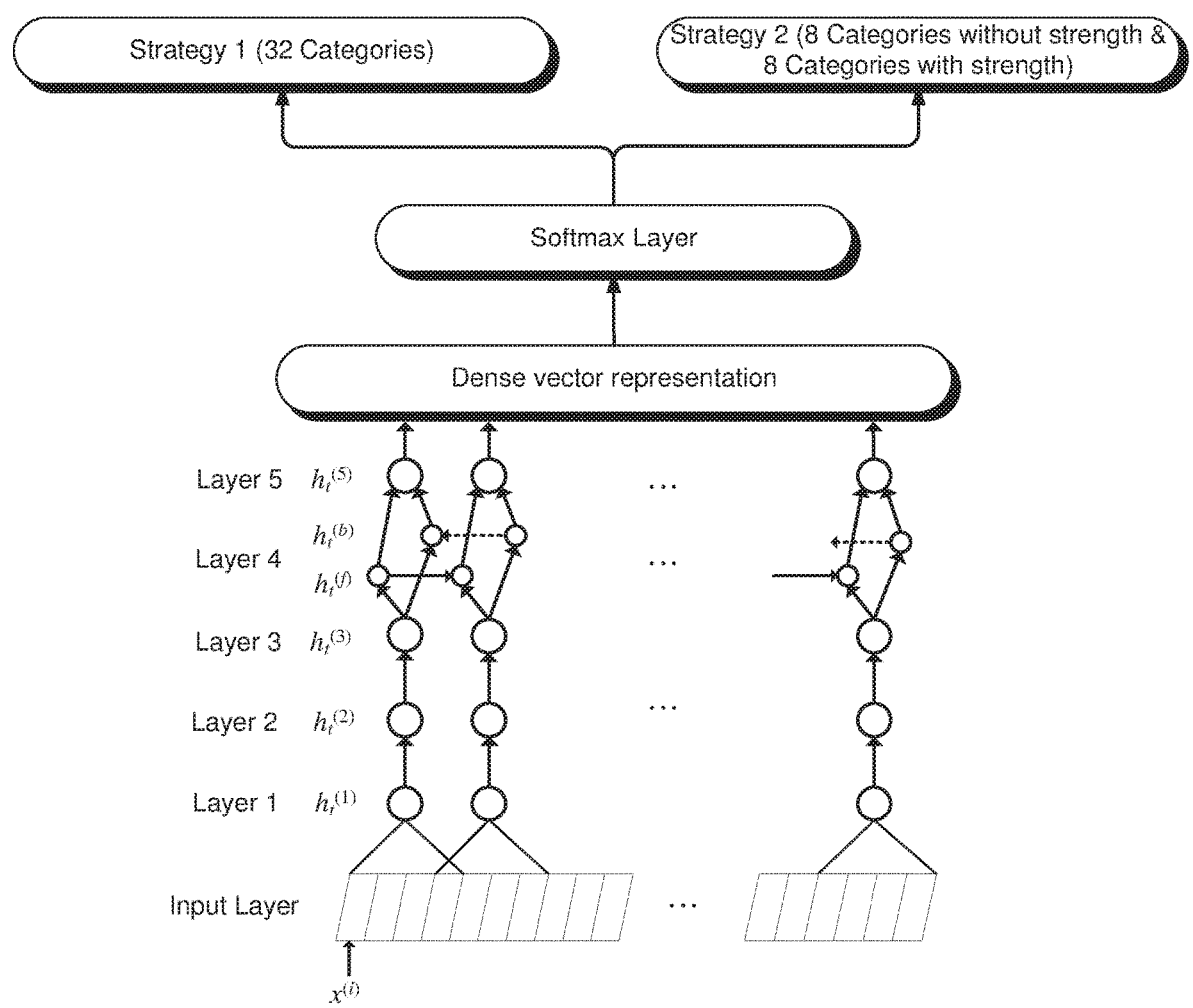
FIG. 16 illustrates an exemplary neural network structure for a voice to emotion classifier according to an embodiment.

FIG. 16 illustrates an exemplary neural network structure 1600 for a voice to emotion classifier according to an embodiment. The neural network structure 1600 may project an input voice segment x into a dense vector representation for a further emotion classification through a softmax layer.

A voice segment $x^{(i)}$ may be inputted in an Input Layer. The voice segment $x^{(i)}$ may be a time-series with a length of $T^{(i)}$, and each slice is a vector of audio features, denoted as $x_t^{(i)}$, where $t=1, 2, \ldots, T^{(i)}$. Spectrograms may be used as input features.

As shown in FIG. 16, there are 5 layers of hidden units, denoted as Layer 1 to Layer 5. For an input sequence x, hidden units in Layer l are denoted as $h^{(l)}$, with a special case that $h^{(0)}$ may stand for the input sequence.

Layer 1, Layer 2 and Layer 3 are not recurrent layers. For Layer 1, at each time t, an output depends on a spectrogram frame $x_t$ along with a context of S frames on each side. Empirically, the value of S may be selected from {3, 5, 7, 9} that minimize an error rate of a valuation set. Layer 2 and Layer 3 operate on independent data for each time step. Thus, for each time t, the first 3 layers may be computed as:

$$h_t^l = g(W^{(l)} h_t^{(l-1)} + b^{(l)})$$ Equation (19)

In Equation (19), a clipped Rectified-Linear activation function g(z) is used, and $W^{(l)}$ and $b^{(l)}$ are weight matrix and bias parameter for Layer l respectively. The value of l is taken from 1, 2, 3 in this example. The function g(z) may be denoted as $g(z) = \min\{\max\{\alpha, z\}, \beta\}$, where α and β are hyper-parameters, and can be adjusted empirically.

Layer 4 is a bi-directional gated recurrent layer (GRU). This layer includes two sets of hidden units, one set for forward left-to-right recurrence $h_t^{(f)}$, and another set for backward right-to-left recurrence $h_t^{(b)}$.

Layer 5 is a non-recurrent layer, which takes a concatenation of the forward units and the backward units in Layer 4 as inputs, and may be computed as:

$$h_t^5 = g(W^{(5)} h_t^{(4)} + b^{(5)})$$ Equation (20)

where $h_t^{(4)}$ is the concatenation of $h_t^{(f)}$ and $h_t^{(b)}$.

A dense vector representation may be generated from outputs of Layer 5. Through the RNN-GRU encoding as discussed above, a dense vector representation for the voice input may be obtained.

The dense vector representation may be further provided to a softmax layer which is configured according to different emotion classifying strategies. The softmax layer in FIG. 16 may function in a similar way with the softmax layer in FIG. 9. For example, the softmax layer in FIG. 16 may output an emotion vector corresponding to the 32 emotions, or output an emotion vector corresponding to the 8 basic emotions, strength levels of the 8 basic emotions, and the 8 combined emotions. The emotion vector output by the softmax layer may be construed as emotion information of the input voice.

A large-scale training dataset for the voice to emotion classifier may be obtained based on existing voice recognition data which includes voice parts and corresponding text parts. For example, the existing voice recognition data may be collected, and the text parts of the data may be automatically annotated by emotion labels through the text to emotion classifier as shown in FIG. 9. Then the voice parts and associated emotion labels may be used as training data.

Figure 17:
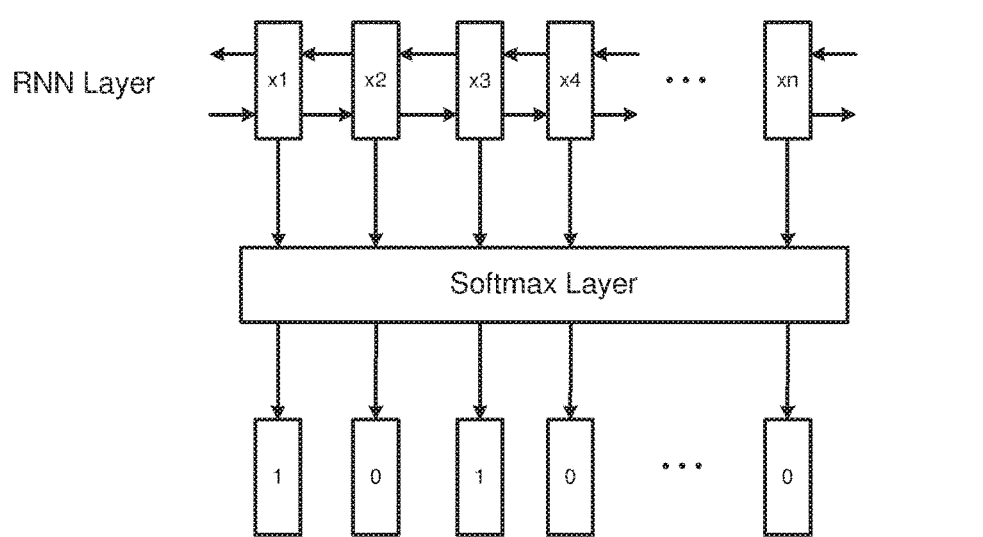
FIG. 17 illustrates an exemplary process for generating voice summary according to an embodiment.

FIG. 17 illustrates an exemplary process 1700 for generating voice summary according to an embodiment.

When generating a summary for a voice document, a bi-directional RNN layer with, such as, LSTM or GRU units, may be used for linking voice vectors for each voice segment in the voice document together. Herein, a voice vector may refer to an emotion vector of a voice segment. In some application scenarios, the voice summary may refer to one or more voice segments with a designated emotion category, and in this case, emotion information, e.g., emotion vectors, may be adopted in the generating of the voice summary.

Voice vectors x1, x2, x3, x4, . . . ,xn for voice segments may be processed in the RNN layer, and then provided to the softmax layer to select voice segments that are to be kept in the voice summary. For example, when value 0 is outputted for a voice vector of a voice segment from the softmax layer, then the voice segment may be not kept in the voice summary. While, if value 1 is outputted for a voice vector of a voice segment from the softmax layer, then this voice segment may be kept in the voice summary. As the example shown in FIG. 17, the output values for the input voice segments are {1, 0, 1, 0, . . . 0}, then the first and third voice segments corresponding to value 1 may be kept to form the voice summary of the voice document. The selection of voice segments in the softmax layer may consider a designated emotion category that may be indicated in a message from the user, such that only those voice segments associated with the designated emotion category will be selected. In some implementations, the above process for generating the voice summary of the voice document may be further based on context information of the voice segments in the voice document. Context information of a voice segment may refer to, e.g., background voices in the voice segment. For example, when a user wants to hear a part about two people howling in a voice document and sends a message about this intent to the chatbot, the chatbot may generate a voice summary of the obtained voice document based at least the received message indicating the user's intent and emotion vectors of the voice segments. During the generation of the voice summary, if there are baby's crying voices in the background of a voice segment, then the baby's crying voices may be construed as context information of the voice segment, and this voice segment may be given a higher weight since the context information may enhance a relevance between the voice segment and the emotion category indicated by the user's intent. In some implementations, the "voice vector" discussed above may further comprise a fact vector of a voice segment, and thus the generation of the voice summary may be further based on fact vectors of the voice segments. For example, the softmax layer may be configured for selecting voice segments based on both emotion vectors and fact vectors of the voice segments.

Figure 18:
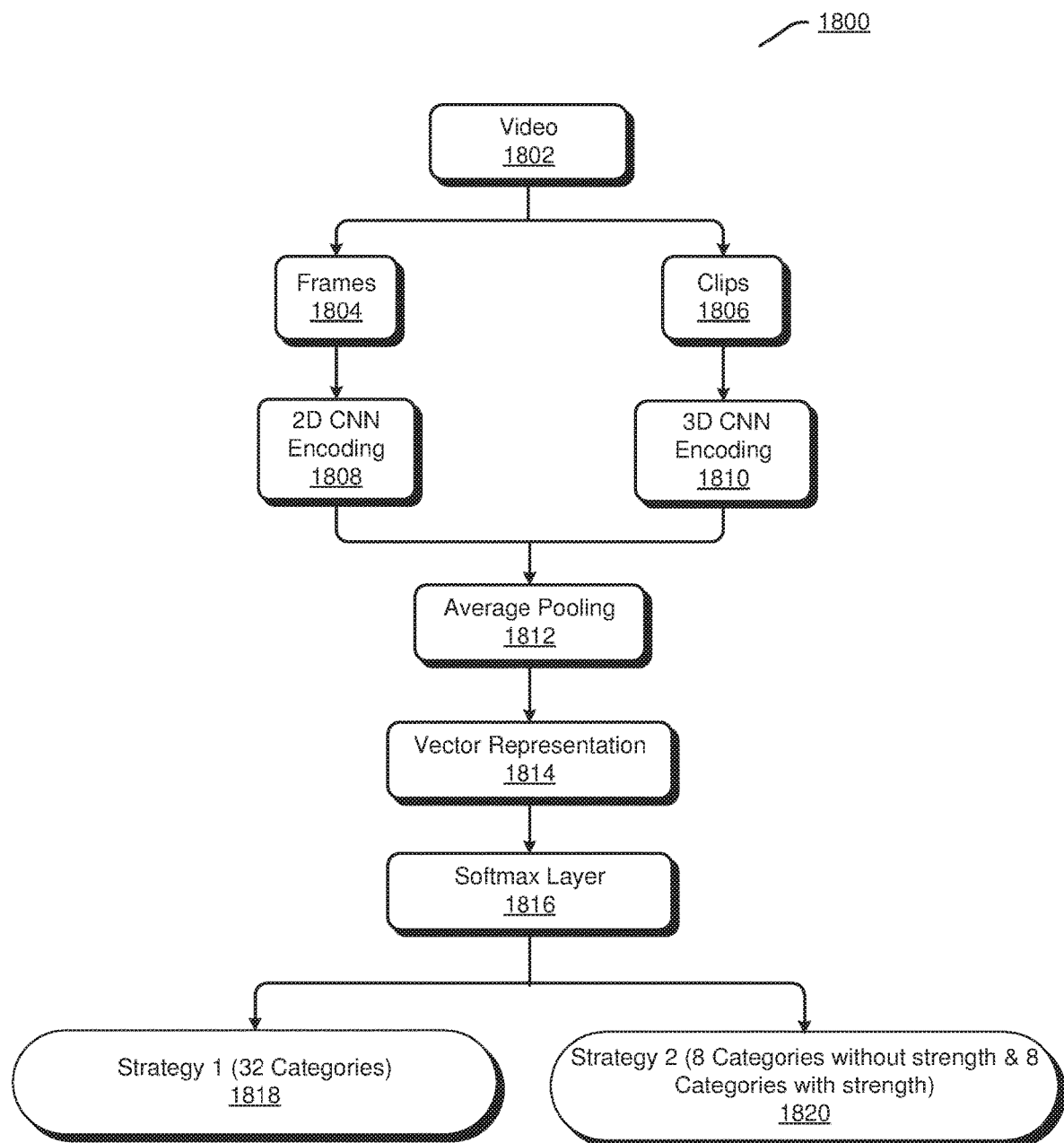
FIG. 18 illustrates an exemplary process for video-to-emotion classification according to an embodiment.

FIG. 18 illustrates an exemplary process 1800 for video-to-emotion classification according to an embodiment. As a video document may be separated into an image part and a corresponding voice part, the video-to-emotion classification may be based on an image-to-emotion classification, or a voice-to-emotion classification, or the combination of them. For simplicity, the process 1800 shows implementing video-to-emotion classification based on image-to-emotion classification. It should be appreciated that the video-to-emotion classification may also be implemented based on voice-to-emotion classification.

As shown in FIG. 18, an input video 1802 may be processed in terms of both frames and clips. As for frames 1804 of the video 1802, a 2D CNN encoding 1808 may be performed. The 2D CNN encoding 1808 may adopt various techniques, e.g., ResNet, AlexNet, GoogLeNet, VGG-Net, etc. As for clips 1806 of the video 1802, a 3D CNN encoding 1810 may be performed. The 3D CNN encoding 1810 may adopt various techniques, e.g., encoding by convolutional 3D filters, etc. An average pooling operation 1812 may be performed on a combination of an output of the 2D CNN encoding 1808 and an output of the 3D CNN encoding 1810, so as to obtain a dense vector representation 1814 for the video 1802.

The dense vector representation 1814 may be further provided to a softmax layer 1816 which is configured according to different emotion classifying strategies. The softmax layer 1816 may function in a similar way with the softmax layer in FIG. 9. For example, the softmax layer 1816 may output an emotion vector corresponding to the 32 emotions, or output an emotion vector corresponding to the 8 basic emotions, strength levels of the 8 basic emotions, and the 8 combined emotions. The emotion vector output by the softmax layer 1816 may be construed as emotion information of the input video.

Furthermore, similar to the process 1700 for generating voice summary, a video summary may be generated for a video document. In some application scenarios, the video summary may refer to one or more video clips with a designated emotion category in the video document, and in this case, emotion vectors may facilitate the generating of the video summary. When generating a summary for a video document, video vectors for video clips in the video document may be processed in a RNN layer, and then provided to a softmax layer to select video clips that are to be kept in the video summary. Herein, the video vectors of the video clips may comprise image vectors and/or voice vectors of the video clips, and each image or voice vector may further comprise a corresponding fact and/or emotion vector. When value 0 is outputted for a video clip from the softmax layer, then this video clip may be not kept in the voice segment, otherwise, if value 1 is outputted for a video clip from the softmax layer, then this video clip may be kept in the video summary.

It should be appreciated that the generating of image summary, voice summary and video summary as discussed above may also be performed indirectly. For example, an image document, voice document or video document may be transformed to a text document firstly, and a text summary generation process may be performed on the text document to obtain a text summary of the text document. Then the text summary may be transformed to an image summary, voice summary or video summary.

According to the embodiments of the present disclosure, a next state of at least one object in a video document may be predicted through a prediction model. Taking a football game video as an example of the video document, football players in the video are objects of interest, and the embodiments of the present disclosure may predict or advise that how to pass the football next among the players may cause a goal in the game. When determining, from a user's message, the user's intent that the user wants to know what will happen or what to do next in the video document, the prediction model may be configured for: obtaining the latest or current image of the video document, e.g., an image part of the latest or current video clip in the video document; identifying RoIs in the current image, wherein each RoI corresponds to an object; determining current states of the objects in the identified RoIs; predicting possible relationships or directions among the RoIs; and selecting top-ranked relationships or directions to form a final advice. The final advice may be in a form of image or video clip, and may comprise annotations of RoIs corresponding to the top-ranked relationships or directions, e.g., blocks surrounding the RoIs, together with annotations of the top-ranked relationships or directions, e.g., arrows from one RoI to another RoI. In an implementation, the prediction by the prediction model may be based on a neural network with a softmax layer. Inputs to the neural network may be fact vectors of the RoIs, and the softmax layer may be configured for selecting RoIs associated with the top-ranked relationships or directions based at least on the user's intent, current states of objects in the video document, and relationships among the RoIs in the latest or current image. Training dataset for the neural network with the softmax layer may be obtained as follows. Taking a football game video as an example of a video document. The football game video may comprise a number of video clips, and emotion changes in voice parts of the video clips may be detected. For example, if a football is shot into a goal net, emotions of voice in related video clips may change from anticipation to ecstasy. Such emotion change of voice may indicate that these video clips are associated with a scenario of shooting the ball into the goal net. Accordingly, RoIs in these video clips together with relationships among the RoIs may be collected and used as training data.

Figure 19:
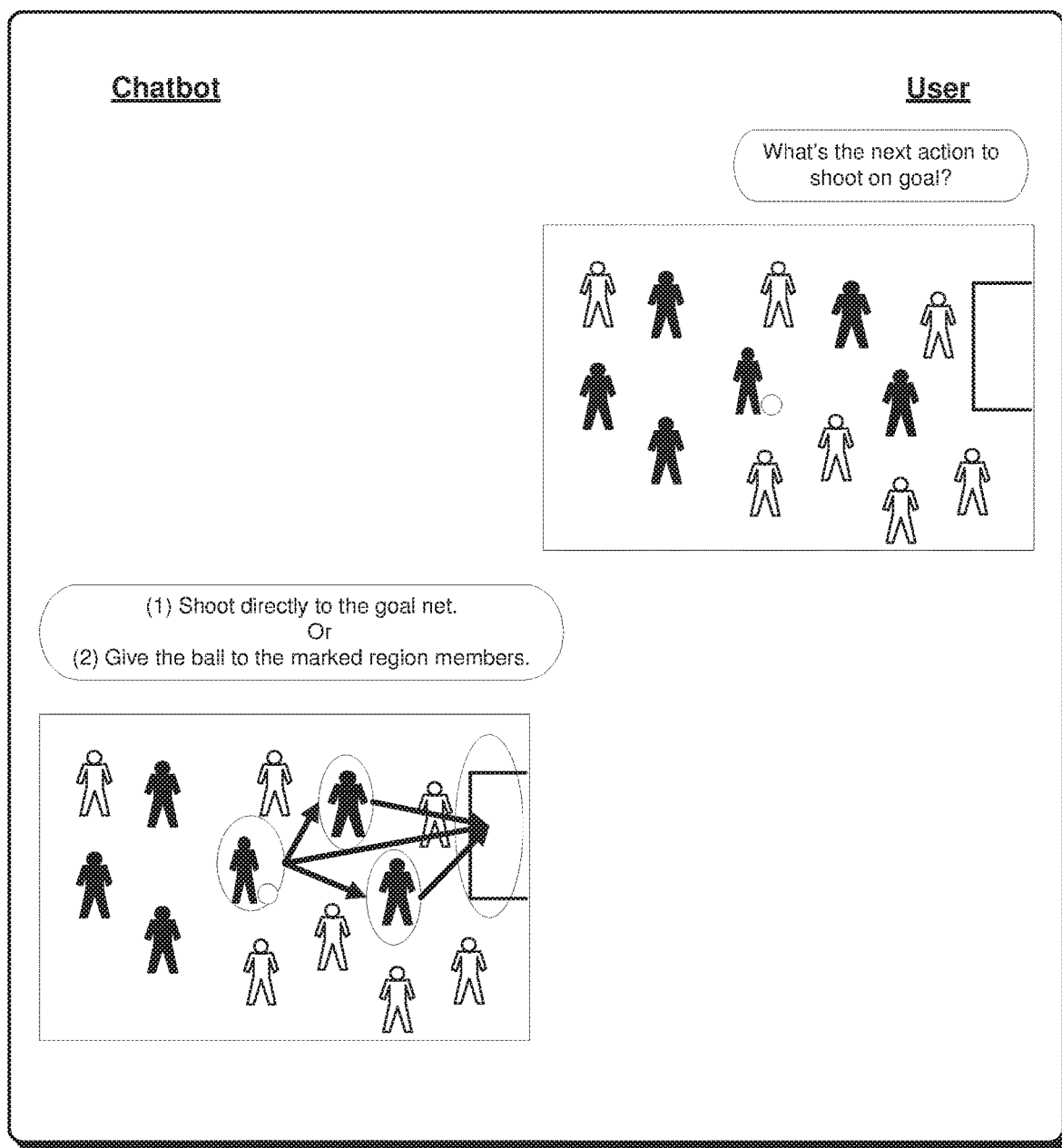
FIG. 19 illustrates an exemplary chat window according to an embodiment.

FIG. 19 illustrates an exemplary chat window 1900 according to an embodiment. As shown in FIG. 19, when the user wants to know how to do to shoot on goal at the next step in the game, the chatbot may identify RoIs from the current video frame and then determine which relationships between the RoIs may satisfy the user's intent. For example, if a relationship between two RoIs satisfies the user's intent, then it will be labeled as 1 and will be kept along with the two RoIs. The kept relationships or directions along with the two related RoIs will be shown with marks as an advice to the user in the chat window 1900.

Figure 20:
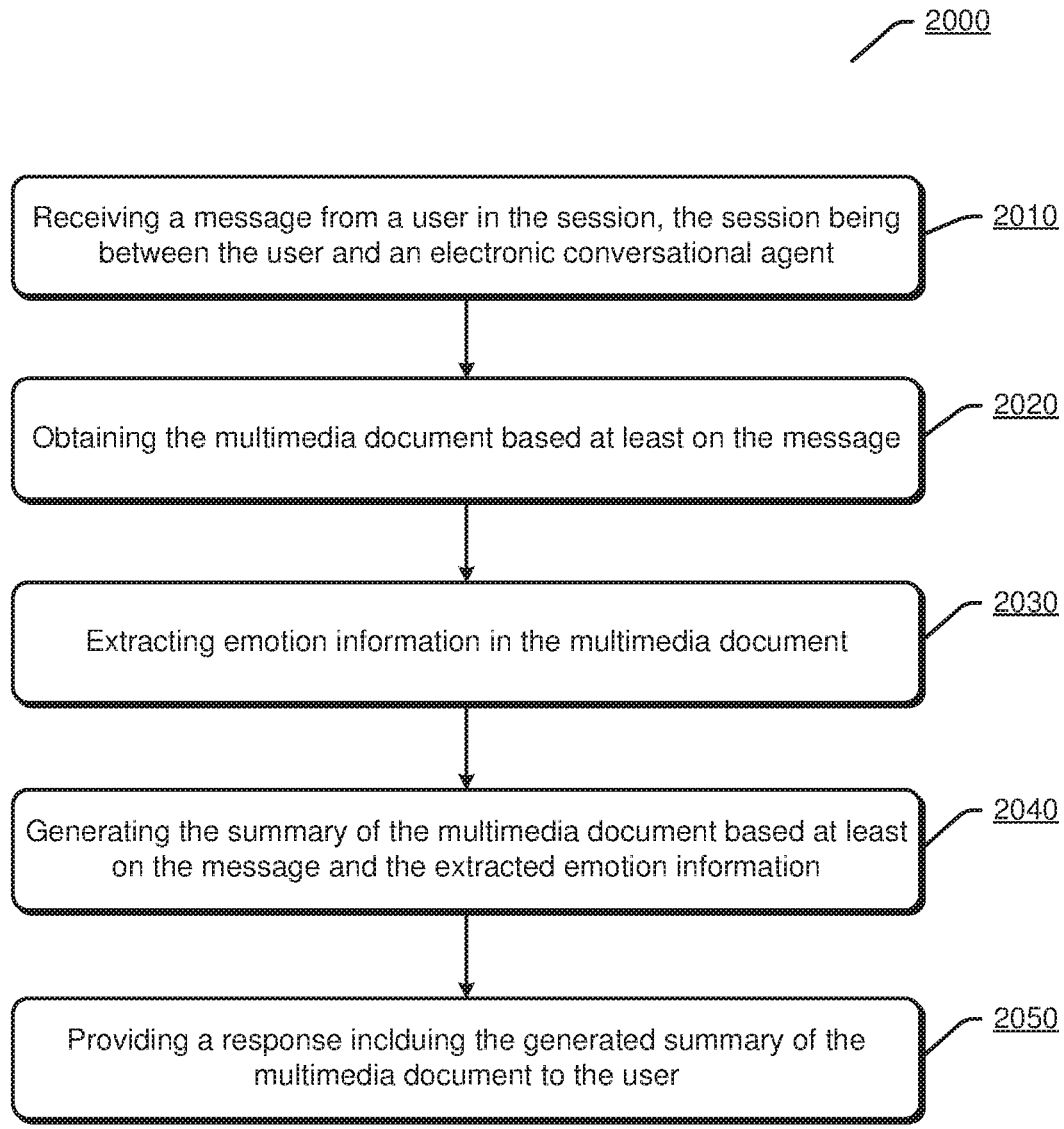
FIG. 20 illustrates a flowchart of an exemplary method for providing a summary of a multimedia document in a session according to an embodiment.

FIG. 20 illustrates a flowchart of an exemplary method 2000 for providing a summary of a multimedia document in a session according to an embodiment. The method 2000 may be implemented when a chatbot is chatting with a user.

At 2010, a message may be received from a user in the session, and the session is between the user and an electronic conversational agent.

At 2020, a multimedia document may be obtained based at least on the message.

At 2030, emotion information in the multimedia document may be extracted.

At 2040, the summary of the multimedia document may be generated based at least on the message and the extracted emotion information.

At 2050, a response including the generated summary of the multimedia document may be provided to the user.

In an implementation, the summary is generated further based on context information of the multimedia document, wherein the context information is obtained from at least one of a user log and a knowledge graph.

In an implementation, the multimedia document comprises a text document associated with the session, the text document comprises multiple topics in the session, and each topic is appended with a lifecycle flag indicating a current state of the topic. The lifecycle flag for each topic is determined based at least on a change of emotion information for the topic in the session.

In an implementation, the multimedia document comprises an image document, and the summary of the image document is generated further through: identifying at least one RoI in the image document; determining emotion information of each RoI; determining a user intent from the message; and generating the summary of the image document based at least on the emotion information of each RoI and the user intent.

In an implementation, the summary of the image document is generated further based on fact information of each RoI.

In an implementation, the multimedia document comprises a voice document, and the summary of the voice document is generated further through: identifying at least one voice segment in the voice document; determining emotion information of each voice segment; determining a user intent from the message; and generating the summary of the voice document based at least on the emotion information of each voice segment and the user intent.

In an implementation, the summary of the voice document is generated further based on fact information of each voice segment.

In an implementation, the multimedia document comprises a video document, and the summary of the video document is generated further through: identifying at least one video clip in the video document; determining emotion information of each video clip; determining a user intent from the message; and generating the summary of the video document based at least on the emotion information of each video clip and the user intent.

In an implementation, each video clip comprises at least one of image part and voice part, and emotion information of each video clip is determined further through determining emotion information of at least one of the image part and the voice part in the video clip.

In an implementation, the emotion information of the image part in the video clip is determined further through identifying at least one RoI in the image part, determining emotion information of each RoI, and obtaining the emotion information of the image part by combining the emotion information of each RoI in the image part.

In an implementation, the emotion information of the voice part in the video clip is determined further through identifying at least one voice segment in the voice part, determining emotion information of each voice segment, and obtaining the emotion information of the voice part by combining the emotion information of each voice segment in the voice part.

In an implementation, the method 2000 may further comprise: predicting a next state of at least one object in the video document based at least on the user intent, a current state of the at least one object and relationship among RoIs in the image part of a current video clip.

In an implementation, the message comprises at least one of text message, image message, voice message and video message.

It should be appreciated that the method 2000 may further comprise any steps/processes for providing a summary of a multimedia document in a session according to the embodiments of the present disclosure as mentioned above.

Figure 21:
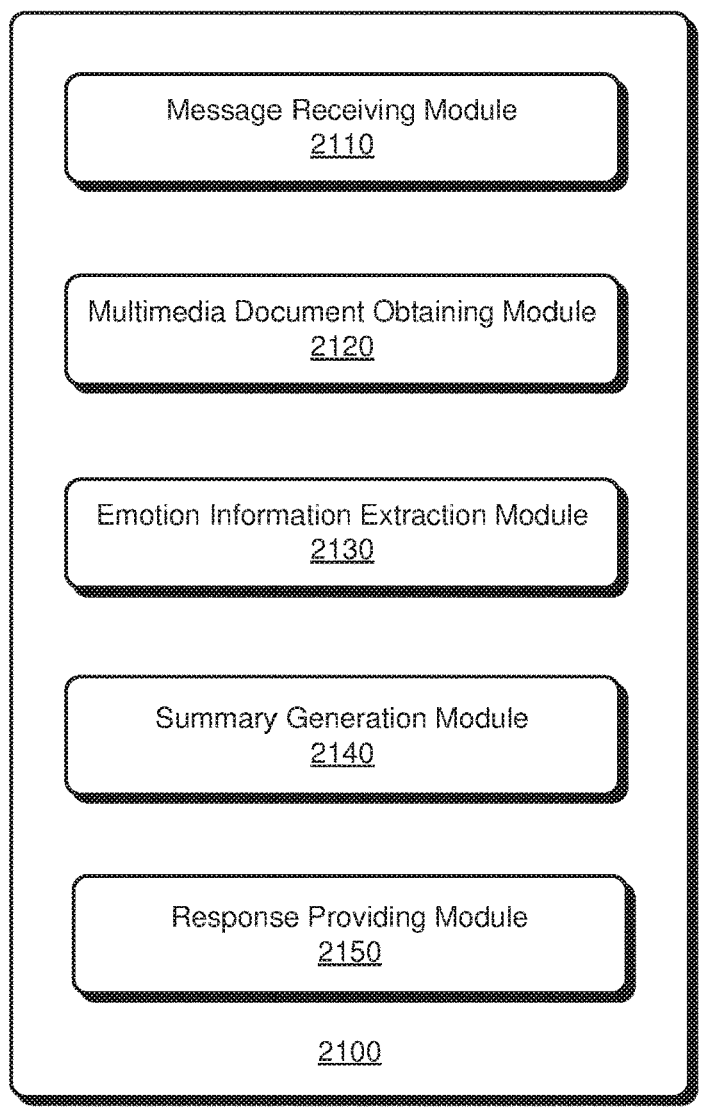
FIG. 21 illustrates an exemplary apparatus for providing a summary of a multimedia document in a session according to an embodiment.

FIG. 21 illustrates an exemplary apparatus 2100 for providing a summary of a multimedia document in a session according to an embodiment.

The apparatus 2100 may comprise: a message receiving module 2110, for receiving a message from a user in the session, the session being between the user and an electronic conversational agent; a multimedia document obtaining module 2120, for obtaining the multimedia document based at least on the message; an emotion information extraction module 2130, for extracting emotion information in the multimedia document; a summary generation module 2140, for generating the summary of the multimedia document based at least on the message and the extracted emotion information; and a response providing module 2150, for providing a response including the generated summary of the multimedia document to the user.

In an implementation, the summary generation module 2140 generates the summary of the multimedia document further based on context information of the multimedia document. The context information is obtained from at least one of a user log and a knowledge graph.

In an implementation, the multimedia document comprises a text document associated with the session, the text document comprises multiple topics in the session, and each topic is appended with a lifecycle flag indicating a current state of the topic.

In an implementation, the multimedia document comprises an image document, and the summary generation module 2140 is further configured for: identifying at least one RoI in the image document; determining emotion information of each RoI; determining a user intent from the message; and generating the summary of the image document based at least on the emotion information of each RoI and the user intent.

In an implementation, the multimedia document comprises a voice document, and the summary generation module 2140 is further configured for: identifying at least one voice segment in the voice document; determining emotion information of each voice segment; determining a user intent from the message; and generating the summary of the voice document based at least on the emotion information of each voice segment and the user intent.

In an implementation, the multimedia document comprises a video document, and the summary generation module 2140 is further configured for: identifying at least one video clip in the video document; determining emotion information of each video clip; determining a user intent from the message; and generating the summary of the video document based at least on the emotion information of each video clip and the user intent.

Moreover, the apparatus 2100 may also comprise any other modules configured for providing a summary of a multimedia document in a session according to the embodiments of the present disclosure as mentioned above.

Figure 22:
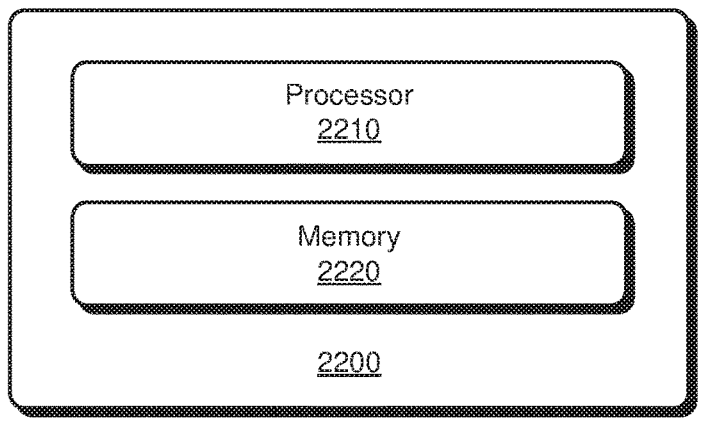
FIG. 22 illustrates another exemplary apparatus for providing a summary of a multimedia document in a session according to an embodiment.

FIG. 22 illustrates another exemplary apparatus 2200 for providing a summary of a multimedia document in a session according to an embodiment.

The apparatus 2200 may comprise at least one processor 2210. The apparatus 2200 may further comprise a memory 2220 that is connected with the processor 2210. The memory 2220 may store computer-executable instructions that, when executed, cause the processor 2210 to perform any operations of the methods for providing a summary of a multimedia document in a session according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for assisting psychological cure in automated chatting according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for providing a summary of a multimedia document in a session, comprising:
    receiving a message from a user in the session, the session being between the user and an electronic conversational agent;
    obtaining the multimedia document based at least on the message;
    calculating an emotion vector and a fact vector for the multimedia document;
    generating the summary of the multimedia document based at least on the message, the emotion vector, and the fact vector; and
    providing a response including the generated summary of the multimedia document to the user.

2. The method of claim 1, wherein generating the summary is further based on context information of the multimedia document, wherein the context information is obtained from at least one of a user log and a knowledge graph.

3. The method of claim 1, wherein the multimedia document comprises a text document associated with the session, the text document comprises multiple topics in the session, and each topic is appended with a lifecycle flag indicating a current state of the topic.

4. The method of claim 3, wherein the lifecycle flag for each topic is determined based at least on a change of emotion information for the topic in the session.

5. The method of claim 1, wherein the multimedia document comprises an image document, and generating the summary of the image document further comprises:
    identifying at least one region of interest (RoI) in the image document;
    determining emotion information of each RoI;
    determining a user intent from the message; and
    generating the summary of the image document based at least on the emotion information of each RoI and the user intent.

6. The method of claim 5, wherein generating the summary of the image document is further based on fact information of each RoI.

7. The method of claim 1, wherein the multimedia document comprises a voice document, and generating the summary of the voice document further comprises:
    identifying at least one voice segment in the voice document;
    determining emotion information of each voice segment;
    determining a user intent from the message; and
    generating the summary of the voice document based at least on the emotion information of each voice segment and the user intent.

8. The method of claim 7, wherein generating the summary of the voice document is further based on fact information of each voice segment.

9. The method of claim 1, wherein the multimedia document comprises a video document, and generating the summary of the video document further comprises:
    identifying at least one video clip in the video document;
    determining emotion information of each video clip;
    determining a user intent from the message; and
    generating the summary of the video document based at least on the emotion information of each video clip and the user intent.

10. The method of claim 9, wherein each video clip comprises at least one of image part and voice part, and further comprising determining emotion information of at least one of the image part and the voice part in the video clip.

11. The method of claim 10, wherein determining the emotion information of the image part in the video clip further comprises identifying at least one region of interest (RoI) in the image part, determining emotion information of each RoI, and obtaining the emotion information of the image part by combining the emotion information of each RoI in the image part, and
    wherein determining the emotion information of the voice part in the video clip further comprises identifying at least one voice segment in the voice part, determining emotion information of each voice segment, and obtaining the emotion information of the voice part by combining the emotion information of each voice segment in the voice part.

12. The method of claim 10, further comprising:
predicting a next state of at least one object in the video document based at least on the user intent, a current state of the at least one object and relationship among regions of interest (ROIs) in the image part of a current video clip.

13. The method of claim 1, wherein the message comprises at least one of text message, image message, voice message and video message.

14. An apparatus for providing a summary of a multimedia document in a session, comprising:
at least one processor; and
memory including instructions that, when executed by the at least one processor, cause the at least one processor to perform operations to:
receive a message from a user in the session, the session being between the user and an electronic conversational agent;
obtain the multimedia document based at least on the message;
calculate an emotion vector and a fact vector for the multimedia document;
generate the summary of the multimedia document based at least on the message, the emotion vector, and the fact vector; and
provide a response including the generated summary of the multimedia document to the user.

15. The apparatus of claim 14, wherein the instructions to generate the summary of the multimedia document further comprises instructions to generate the summary based on context information of the multimedia document, wherein the context information is obtained from at least one of a user log and a knowledge graph.

16. The apparatus of claim 14, wherein the multimedia document comprises a text document associated with the session, the text document comprises multiple topics in the session, and each topic is appended with a lifecycle flag indicating a current state of the topic.

17. The apparatus of claim 14, wherein the multimedia document comprises an image document, and the instructions to generate the summary of the multimedia document further comprises instructions, that when executed by the at least one processor, cause the at least one processor to perform operations to:
identify at least one region of interest (RoI) in the image document;
determine emotion information of each RoI;
determine a user intent from the message; and
generate the summary of the image document based at least on the emotion information of each RoI and the user intent.

18. The apparatus of claim 14, wherein the multimedia document comprises a voice document, and the instructions to generate the summary of the multimedia document further comprises instructions, that when executed by the at least one processor, cause the at least one processor to perform operations to:
identify at least one voice segment in the voice document;
determine emotion information of each voice segment;
determine a user intent from the message; and
generate the summary of the voice document based at least on the emotion information of each voice segment and the user intent.

19. The apparatus of claim 14, wherein the multimedia document comprises a video document, and the instructions to generate the summary of the multimedia document further comprises instructions, that when executed by the at least one processor, cause the at least one processor to perform operations to:
identify at least one video clip in the video document;
determine emotion information of each video clip;
determine a user intent from the message; and
generate the summary of the video document based at least on the emotion information of each video clip and the user intent.

20. At least one non-transitory machine-readable medium including instructions for providing a summary of a multimedia document in a session that, when executed, cause one or more processors to:
receive a message from a user in the session, the session being between the user and an electronic conversational agent;
obtain the multimedia document based at least on the message;
calculate an emotion vector and a fact vector for the multimedia document;
generate the summary of the multimedia document based at least on the message, the emotion vector, and the fact vector; and
provide a response including the generated summary of the multimedia document to the user.

* * * * *